(12) United States Patent
Tanaka et al.

(10) Patent No.: US 6,382,081 B2
(45) Date of Patent: *May 7, 2002

(54) RECIPROCATING COMPRESSOR

(75) Inventors: Yasuhiko Tanaka; Ikutomo Umeoka, both of Nara; Ichiro Kita, Shiki-gun; Masataka Oda, Osaka, all of (JP)

(73) Assignee: Matsushita Refrigeration Company, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/297,922

(22) PCT Filed: Nov. 25, 1997

(86) PCT No.: PCT/JP97/04275

§ 371 Date: Jul. 13, 1999

§ 102(e) Date: Jul. 13, 1999

(87) PCT Pub. No.: WO98/23862

PCT Pub. Date: Jun. 4, 1998

(30) Foreign Application Priority Data

Nov. 26, 1996 (JP) ............................. P8-314575
Jan. 14, 1997 (JP) ............................. P9-004296
Jan. 27, 1997 (JP) ............................. P9-012166
Sep. 24, 1997 (JP) ............................. P9-258140

(51) Int. Cl.$^7$ ................................................ F01B 29/00
(52) U.S. Cl. ...................... 92/128; 92/157; 74/579 E; 74/587
(58) Field of Search ...................... 92/128, 157, 216; 74/579 R, 579 E, 587

(56) References Cited

U.S. PATENT DOCUMENTS 1,741,621 A * 12/1929 Godfrey ..................... 74/579 E
2,005,107 A *  6/1935 Phillips et al. ................. 92/157

(List continued on next page.)

FOREIGN PATENT DOCUMENTS

DE   31 11 947    10/1982
DE   44 18 112    12/1995

(List continued on next page.)

*Primary Examiner*—F. Daniel Lopez
(74) *Attorney, Agent, or Firm*—Wenderoth, Lind & Ponack, L.L.P.

(57) ABSTRACT

A reciprocating compressor (K1–K3) comprising a connecting rod (21) in which a small end portion (22) having a small hole (22a) and a large end portion (25) having a large hole (25a) are coupled with each other; wherein the small end portion (22) is coupled with a piston (24) by a piston pin (23) loosely fitted into the small hole (22a), while an eccentric shaft (7a) of a crank shaft (7) is loogely fitted into the large hole (25a), wherein the large end portion (25) is formed with a cylindrical bore (25b) having an axis passing through a center of the large hole (25a) and a fixing hole (25c, 28, 30) communicating with the cylindrical bore (25b); wherein after a cylindrical distal end retaining portion (22c) of a rod portion (22b) of the small end portion (22) has been loosely fitted into or lightly press fitted into the cylindrical bore (25b), not only the cylindrical distal end portion (22c) is fixed in the cylindrical bore (25b) by inserting a locking pin (26) into the fixing hole (25c, 28, 30) while a small torsional degree of freedom about an axis of the rod portion (22b) is being imparted to the rod portion (22b) but axes of the small hole (22a) and the large hole (25a) of the connecting rod (21) are disposed so as to be maintained on an identical plane.

10 Claims, 21 Drawing Sheets

U.S. PATENT DOCUMENTS

| | | | |
|---|---|---|---|
| 2,445,020 A | | 7/1948 | Charles |
| 2,675,759 A | * | 4/1954 | Yarger .................. 417/307 |
| 3,276,677 A | * | 10/1966 | Trask .................... 92/157 |
| 4,930,405 A | | 6/1990 | Lilie |
| 5,848,566 A | * | 12/1998 | Walsh ................... 92/128 |

FOREIGN PATENT DOCUMENTS

| | | |
|---|---|---|
| EP | 0 592 812 | 4/1994 |
| GB | 2 211 272 | 6/1989 |
| JP | 4-164174 | 6/1992 |
| JP | 5-84837 | 12/1993 |

* cited by examiner

RECIPROCATING COMPRESSOR

TECHNICAL FIELD

The present invention relates to a relatively compact reciprocating compressor employed in a refrigerator for home use or the like.

BACKGROUND ART

Recently, various improvements for more compactness and facilitation of assembly have been made in reciprocating-compressors and there are users' demands for higher efficiency and lower noises.

Reciprocating compressors of this kind are disclosed in, for example, Japanese Patent Laid-Open Publication No. 4-164174 (1992) and Japanese Patent Publication No. 5-84837 (1993).

In the known reciprocating compressor disclosed in Japanese Patent Publication No. 5-84837 (1993), a compressor body 1 is suspended in a housing 3 by a spring 2 so as to be supported as shown in FIG. 35. A crank case 4 includes a mounting portion 4a for mounting a motor stator 5 thereon, a bearing portion 4b for supporting a crank shaft 7 and a cylinder 4c for reciprocating a piston 8 therein, which are formed integrally. A motor rotor 6 is mounted on the crank shaft 7 and the crank shaft 7 includes an eccentric shaft 7a.

A detailed construction of a connecting rod 10 is shown in FIG. 37. The connecting rod 10 includes a small end portion 11 and a large end portion 14. The small end portion 11 includes a cylindrical portion 11e having a small hole 11a and a rod portion 11b having a rectangular cross-sectional shape, which are formed integrally. The rod portion 11b extends radially outwardly from the cylindrical portion 11e and has a pair of parallel side faces 11d and a V-shaped distal end 11c. Meanwhile, the large end portion 14 includes a cylindrical portion 14d having a large hole 14a and a boss 14b projecting radially outwardly from the cylindrical portion 14d, which are formed integrally. A bore 14c for fitting the distal end 11c of the rod portion 11b of the small end portion 11 thereinto is formed at a central portion of an end face of the boss 14b.

This known reciprocating compressor is assembled as shown in FIG. 36. Namely, the small end portion 11 of the connecting rod 10 is coupled with the piston 8 by a piston pin 9 and is fitted into the cylinder 4c from an outer side, i.e., a right side in FIG. 36. Then, a valve plate 12 and a cylinder head 13 are fixed to the cylinder 4c. On the other hand, the eccentric shaft 7a of the crank shaft 7 is fitted into the large hole 14a of the large end portion 14 of the connecting rod 10. Subsequently, the distal end 11c of the rod portion 11b of the small end portion 11 is fitted into the bore 14c of the boss 14b of the large end portion 14 and then, the small end portion 11 and the large end portion 14 are coupled with each other by welding, etc.

Therefore, by coupling the small end portion 11 and the large end portion 14 of the connecting rod 10 as described above, rotation of the crank shaft 7 is converted into reciprocation of the piston 8 so as to compress refrigerant sucked into the cylinder 4c.

However, in the above described arrangement of the known reciprocating compressor, the small end portion 11 and the large diameter portion 14 of the connecting rod 10 are joined to each other by welding, etc. after fitting of the distal end 11c of the rod portion 11b of the small end portion 11 into the bore 14c of the large diameter portion 14. Thus, such an inconvenience is incurred that the distal end 11c of the rod portion 11b and the bore 14c of the large end portion 14 should be finished to highly accurate surface roughness.

Furthermore, even if an axis of the large hole 14a and an axis of the bore 14c deviate from each other even slightly or parallel of the parallel surfaces 11d of the rod portion 11b to an axis of the small holes 11a is out of order even slightly, there is a risk that the axis of the large holes 14a and the axis of the small hole 11a are subjected to torsion so as to increase rotational load during compression and suction processes upon rotation of the crank shaft 7, thereby resulting in drop of efficiency.

Meanwhile, in the known reciprocating compressor, there is also a risk that vibrations produced at the piston 8, the piston pin 9 and the small end portion 11 are directly transmitted to the large end portion 14, thus resulting in production of abnormal noises between the large end-portion 14 and the eccentric shaft 7a.

Moreover, in this known reciprocating compressor, since small end portion 11 and the large end portion 14 of the connecting rod 10 are coupled with each other by welding or bonding, the number of its assembly steps increases. In addition, since the small end portion 11 and the large end portion 14 of the connecting rod 10 are fixed to each other immovably by welding or bonding, distortion or torsion of the axes of the small hole 11a and the large hole 14a is not absorbed by coupling between the small end portion 11 and the large end portion 14. As a result, machining accuracy of the small hole 11a, the large hole 14a, the distal end 11c and the bore 14c should be raised.

DISCLOSURE OF INVENTION

Accordingly, the present invention has for its object to provide, with a view to eliminating the above mentioned disadvantages of prior art, a reciprocating compressor in which its parts can be machined and assembled with high precision easily and rotational load caused by torsion of axes of a large hole and a small hole of a connecting rod is lessened such that not only efficiency of the reciprocating compressor is raised but noises and vibrations of the reciprocating compressor are reduced.

In order to accomplish this object, a reciprocating compressor according to the present invention comprises: a connecting rod which includes a small end portion and a large end portion coupled with each other; wherein the small end portion has a small hole and is coupled with a piston by a piston pin loosely fitted into the small hole, while the large end portion has a large hole such that an eccentric shaft of a crank shaft is loosely fitted into the large hole; wherein the large end portion is formed with a cylindrical bore having an axis passing through a center of the large hole and a fixing hole communicating with the cylindrical bore; wherein the small end portion includes a cylindrical portion having the small hole and a rod portion extending radially outwardly from the cylindrical portion such that the cylindrical portion and the rod portion are formed integrally; wherein a cylindrical retaining portion is provided at a distal end portion of the rod portion of the small end portion; wherein after the cylindrical retaining portion has been loosely fitted into or lightly press fitted into the cylindrical bore, not only the cylindrical retaining portion is retained in the cylindrical bore by inserting a locking pin into the fixing hole while a small torsional degree of freedom about an axis of the rod portion is being imparted to the rod portion but axes of the small hole and the large hole of the connecting rod are maintained on an identical plane.

Therefore, in the reciprocating compressor of the present invention, increase of rotational load upon rotation of the crank shaft during compression and suction processes and drop of efficiency due to this increase of rotational load can be obviated. Furthermore, machining properties of its parts can be upgraded and production and assembly of the reciprocating compressor can be facilitated.

This object and features of the present invention will become clear from the following description taken in conjunction with the preferred embodiments thereof with reference to the accompanying drawings throughout which like parts are designated by like reference numerals.

BEST MODE FOR CARRYING OUT THE INVENTION

Figure 1:
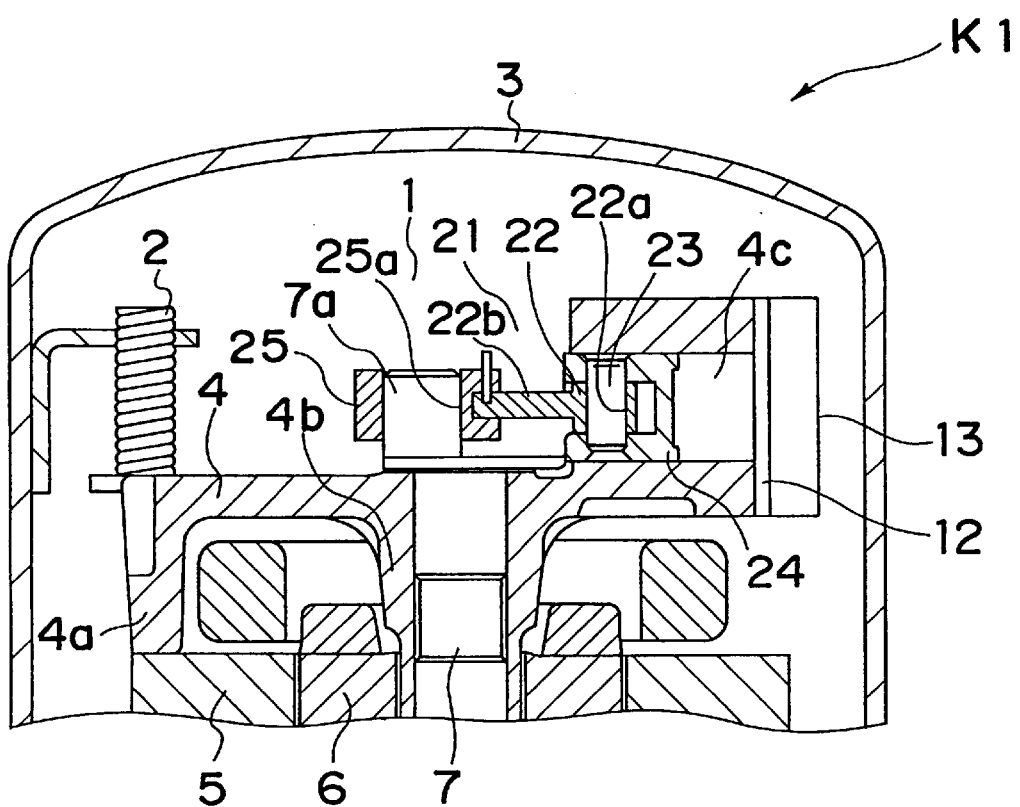
FIG. 1 is a partly sectional fragmentary view of a reciprocating compressor according to a first embodiment of the present invention.

Hereinafter, preferred embodiments of the present invention are described with reference to the attached drawings. FIG. 1 shows a reciprocating compressor K1 according to a first embodiment of the present invention. In the reciprocating compressor K1, a compressor body 1 is suspended in a housing 3 so as to be supported. A crank case 4 includes a mounting portion 4a for mounting a motor stator 5 thereon, a bearing portion 4b for supporting a crank shaft 7 and a cylinder 4c for reciprocating a piston 24 therein, which are formed integrally. A motor rotor 6 is mounted on the crank shaft 7 and the crank shaft 7 includes an eccentric shaft 7a. A valve plate 12 and a cylinder head 13 are secured to the cylinder 4c.

The reciprocating compressor K1 further includes a connecting rod 21. The connecting rod 21 includes a small end portion 22 and a large end portion 25. The small end portion 22 is coupled with the piston 24 by a piston pin 23 loosely fitted into a small hole 22a of the small end portion 22, while the eccentric shaft 7a of the crank shaft 7 is loosely fitted into a large hole 25a of the large end portion 25.

Figure 2:
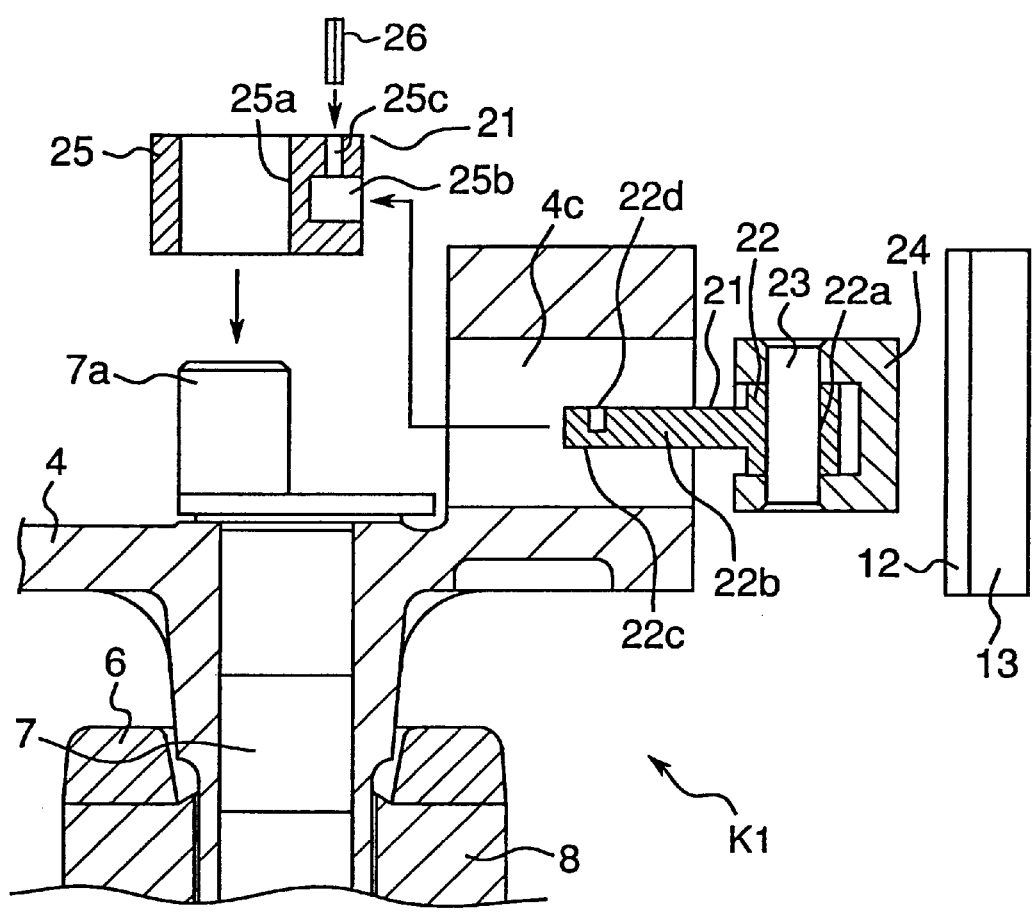
FIG. 2 is a partly sectional exploded view of the reciprocating compressor of FIG. 1, particularly showing a connecting rod and a piston.

FIG. 2 shows an assembly method of the reciprocating compressor K1 in which the piston 24 assembled with the small end portion 22 is inserted into the cylinder 4c from one side of the cylinder 4c remote from the crank shaft 7 and the eccentric shaft 7a of the crank shaft 7 is fitted into the large hole 25a of the large end portion 25 by lowering the large end portion 25 downwardly from above the eccentric shaft 7a.

A cylindrical bore 25b is formed on an end face of the large end portion 25 such that an axis of the cylindrical bore 25b passes through a center of the large hole 25a. A fixing hole 25c is formed on the large end portion 25 so as to pierce through an upper wall of the cylindrical bore 25b such that the fixing hole 25c opens to the cylindrical bore 25c. Meanwhile, the small end portion 22 includes a cylindrical portion 22e having the small hole 22a and a cylindrical rod portion 22b extending radially outwardly from the cylindrical portion 22e, which are formed integrally. A retaining hole 22d is formed, as a blind hole, at a distal end portion of the rod portion 22b such that the distal end portion of the rod portion 22b acts as a retaining portion 22c.

Figure 3:
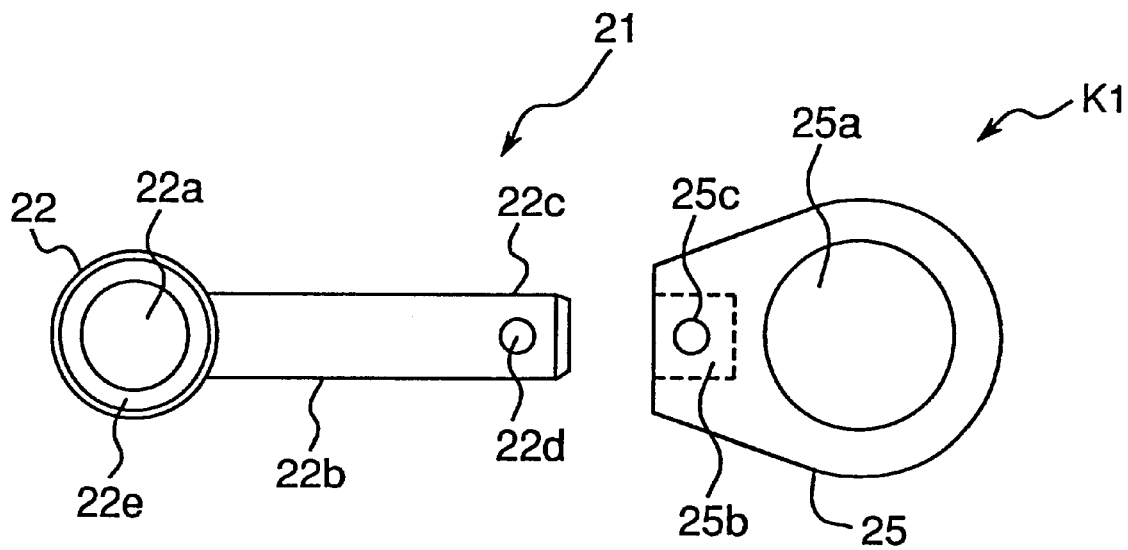
FIG. 3 is a top plan view showing the connecting rod of FIG. 2 prior to its assembly.
Figure 4:
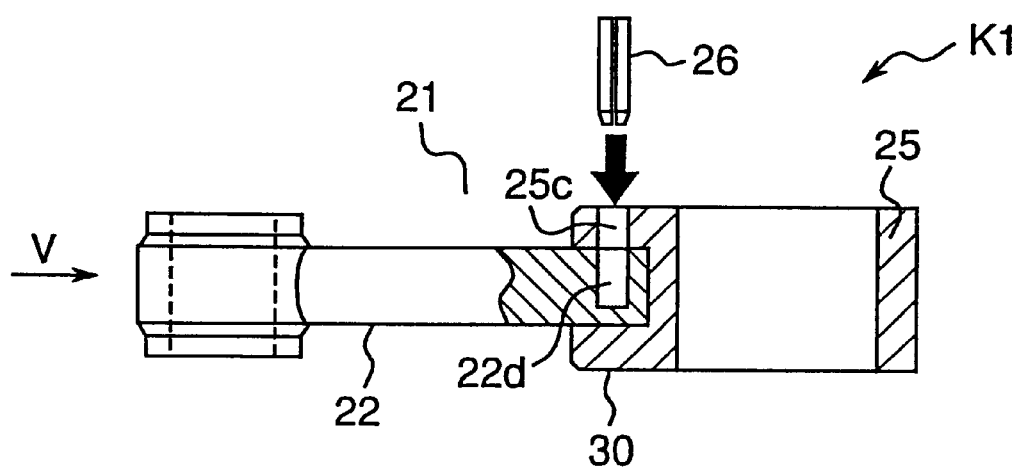
FIG. 4 is a partly sectional front elevational view showing the connecting rod of FIG. 2 during its assembly.

In FIGS. 3 and 4, after the retaining portion 22c of the rod portion 22b of the small end portion 22 has been inserted into the cylindrical bore 25b of the large end portion 25, a locking pin 26 is inserted from the fixing hole 25c into the retaining hole 22d of the small end portion 22 so as to couple the small end portion 22 and the large end portion 25 of the connecting rod 21 with each other.

In the above described arrangement of the reciprocating compressor K1, since both of the bore 25b of the large-end portion 25 and the retaining portion 22c of the small end portion 22, which act as a coupling means between the large end portion 25 and the small end portion 22, are cylindrical, the bore 25b and the retaining portion 22c can be easily machined with high dimensional precision.

Figure 5:
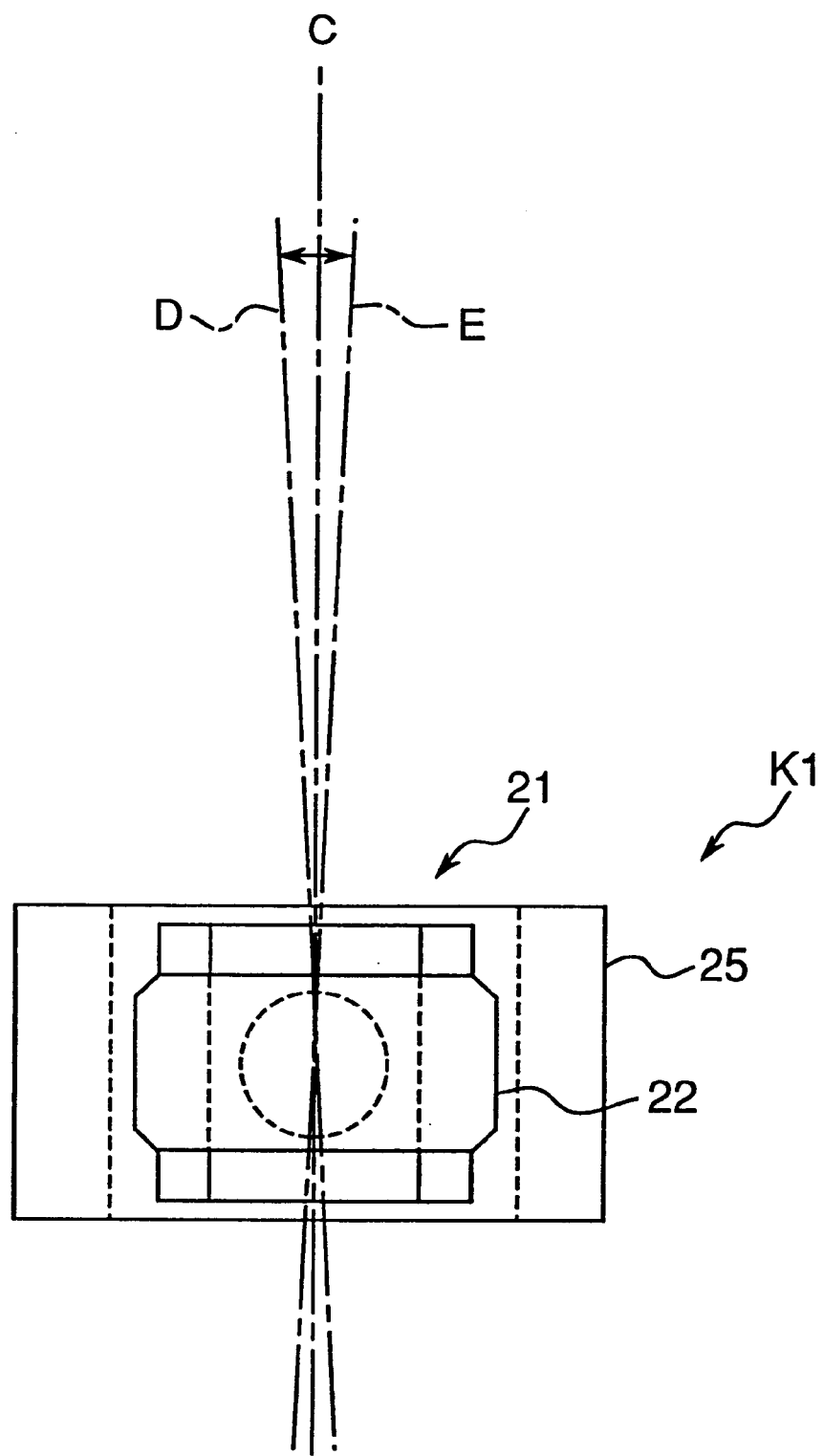
FIG. 5 is an end view as observed in the direction of the arrow V in FIG. 4, showing the connecting rod of FIG. 2 during drive of the reciprocating compressor of FIG. 1.

FIG. 5 shows a view in the direction of the arrow V in FIG. 4. In FIG. 5, a line C represents an axis of the large hole 25a, while lines D and E represent an axis of the small hole 22a. When the line C has a length of 100 mm, a deflection from the line C to the line D or E is mere 100 microns or so. As described above, both of the bore 25b and the retaining portion 22c, which acts as the coupling means between the large end portion 25 and the small end portion 22, are cylindrical. Thus, before the locking pin 26 is inserted into the retaining hole 22d, the axis of the small hole 22a can be deflected about an axis of the rod portion 22b from the line D to the line E or from the line E to the line D. However, after the locking pin 26 has been inserted into the retaining hole 22d, the axis of the small hole 22a is fixed by elastic force of the locking pin 26 so as to substantially coincide with the line C.

Therefore, if the axes of the small hole 22a and the large hole 25a do not coincide with each other completely at the line C due to their distortion during compression and suction processes of a reciprocating compressor, abnormal contact between the small hole 22a and the piston pin 23 or between the large hole 25a and the eccentric shaft 7a happens and thus, rotational load increases, thereby resulting in drop of efficiency.

On the contrary, in the reciprocating compressor K1, since the rod portion 22b has slight torsional degree of freedom about the axis of the rod portion 22b and the locking pin 26 has a self-compensating function of absorbing the minute deflection of the axis of the small hole 22a between the lines D and E so as to make the axes of the small hole 22a and the large hole 25a coincident with each other stably, increase of rotational load caused by torsion of the axes of the small hole 22a and the large hole 25a and drop efficiency due to this increase of rotational load can be prevented.

Figure 6:
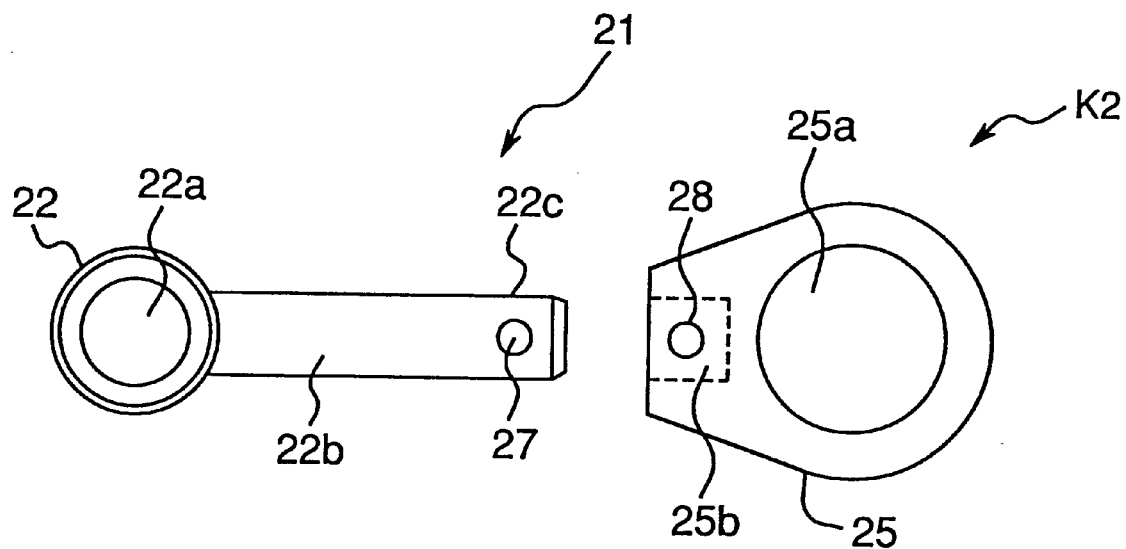
FIG. 6 is a top plan view showing a connecting rod of a reciprocating compressor according to a second embodiment of the present invention prior to its assembly.
Figure 7:
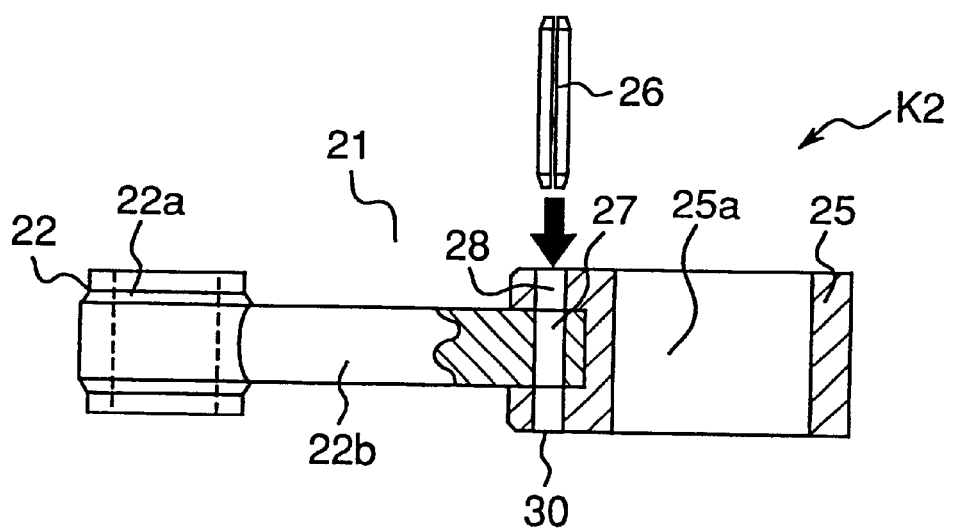
FIG. 7 is a partly sectional front elevational view showing the connecting rod of FIG. 6 during its assembly.

FIGS. 6 and 7 show the connecting rod 21 employed in a reciprocating compressor K2 according to a second embodiment of the present invention. A retaining through-hole 27 is formed at the retaining portion 22c in parallel with the small hole 22a. Meanwhile, a fixing through-hole 28 is formed on the large end portion 25 so as to pierce through upper and lower walls of the cylindrical bore 25b via the retaining through-hole 27 of the small end portion 22 when the retaining portion 22c of the small end portion 22 has been inserted into the cylindrical bore 25b of the large end portion 25. By inserting the locking pin 26 through the fixing through-hole 28 of the large end portion 25 via the retaining through-hole 27 of the small end portion 22, the connecting rod 21 is assembled. Since other constructions of the reciprocating compressor K2 are similar to those of the reciprocating compressor K1, the description is abbreviated for the sake of brevity.

Therefore, when the small end portion 22 and the large end portion 25 are coupled with each other during assembly of the reciprocating compressor K2, the retaining through-hole 27 of the small end portion 22 and the fixing through-hole 28 of the large end portion 25 form a through-hole, so that the locking pin 26 can be inserted into the fixing through-hole 28 from either one of opposite faces of the large end portion 25. As a result, not only the retaining through-hole 27 and the fixing through-hole 28 can be easily machined with high dimensional accuracy but assembly of the reciprocating compressor K2 is further facilitated. Meanwhile, increase of rotational load caused by torsion of the axes of the small hole 22a and the large hole 25a and drop of efficiency due to this increase of rotational load can be prevented.

Figure 8:
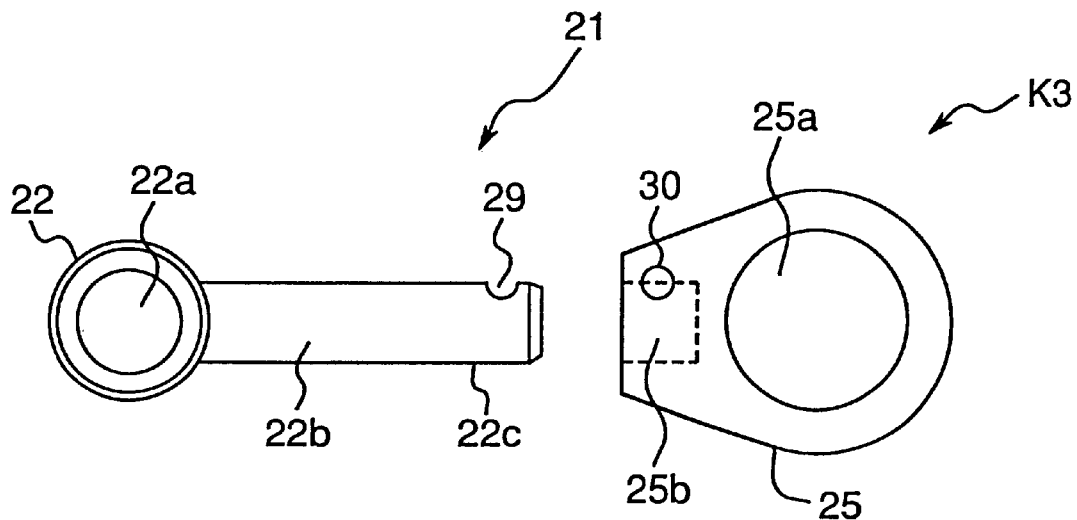
FIG. 8 is a top plan view showing a connecting rod of a reciprocating compressor according to a third embodiment of the present invention prior to its assembly.
Figure 9:
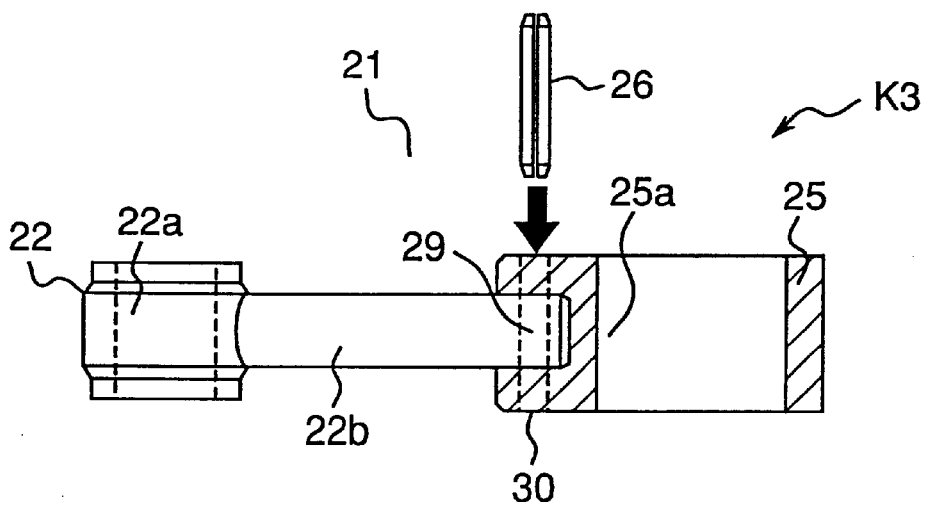
FIG. 9 is a partly sectional front elevational view showing the connecting rod of FIG. 8 during its assembly.

FIGS. 8 and 9 show the connecting rod 21 employed in a reciprocating compressor K3 according to a third embodiment of the present invention. A key groove 29 is formed on a side surface of the retaining portion 22c of the rod portion 22b of the small end portion 22 in parallel with the small hole 22a. Meanwhile, a fixing through-hole 30 is formed on the large end portion 25 so as to pierce through the large end portion 25 at a periphery of the cylindrical bore 25b such that the fixing through-hole 30 confronts the key groove 29 when the retaining portion 22c of the small end portion 22 has been inserted into the cylindrical bore 25b. By inserting the locking pin 26 through the fixing through-hole 30 of the large end portion 25 via the key groove 29 of the small end portion 22, the connecting rod 21 is assembled. Since other constructions of the reciprocating compressor K3 are similar to those of the reciprocating compressor K1, the description is abbreviated for the sake of brevity.

Therefore, when the small end portion 22 and the large end portion 25 are coupled with each other during assembly of the reciprocating compressor K3, the key groove 29 of the small end portion 22 and the fixing through-hole 30 of the large end portion 25 form a through-hole, so that the locking pin 26 can be inserted into the fixing through-hole 30 from either one of opposite faces of the large end portion 25 and thus, assembly of the reciprocating compressor K3 is facilitated. In addition, since the key groove 29 can be machined more easily than the retaining hole 22d of the reciprocating compressor K1 and the retaining through-hole 27 of the reciprocating compressor K2, machining of the reciprocating compressor K3 is further facilitated. It is needless to say that increase of rotational load caused by torsion of the axes of the small holes 22a and the large hole 25a and drop of efficiency due to this increase of rotational load can be prevented. hole 22d of the reciprocating compressor K1 and the retaining through-hole 27 of the reciprocating compressor K2, machining of the reciprocating compressor K3 is further facilitated. It is needless to say that increase of rotational load caused by torsion of the axes of the small hole 22a and the large hole 25a and drop of efficiency due to this increase of rotational load can be prevented.

As is clear from the foregoing description, the reciprocating compressors K1 to K3 include the large end portion formed with the cylindrical bore having the axis passing through the center of the large hole and the fixing hole communicating with the cylindrical bore; wherein the small end portion includes the cylindrical portion having the small hole and the rod portion extending radially outwardly from the cylindrical portion such that the cylindrical portion and the rod portion are formed integrally; wherein the cylindrical retaining portion is provided at the distal end portion of the rod portion of the small end portion; wherein after the cylindrical retaining portion has been loosely fitted into or lightly press fitted into the cylindrical bore, not only the cylindrical retaining portion is retained in the cylindrical bore by inserting the locking pin into the fixing hole while a small torsional degree of freedom about the axis of the rod portion is being imparted to the rod portion but the axes of the small hole and the large hole of the connecting rod are disposed so as to be maintained on an identical plane.

Therefore, in the reciprocating compressors K1 to K3, increase of rotational load caused by torsion of the axes of the small hole and the large hole and drop of efficiency due to this increase of rotational load can be prevented. Meanwhile, both of the bore of the large end portion and the retaining portion of the small end portion, which act as the coupling means between the large end portion and the small end portion, are cylindrical, the bore and the retaining portion can be easily machined with high dimensional precision and production and assembly of the reciprocating compressors K1 to K3

Meanwhile, in the reciprocating compressor K2, after the retaining portion of the small end portion has been fitted into the cylindrical bore of the large end portion, the locking pin is inserted through the fixing hole of the cylindrical bore via the retaining hole of the retaining portion of the rod portion. Therefore, since the locking pin can be inserted into the fixing hole from either one of the opposite faces of the large end portion, the reciprocating compressor K2 can be assembled more easily.

Furthermore, in the reciprocating compressor K3, the key groove is formed on the side surface of the cylindrical retaining portion of the small end portion and the fixing hole is formed on the large end portion at the periphery of the cylindrical bore so as to confront the key groove when the cylindrical retaining portion of the small end portion has been inserted into the cylindrical bore of the large end portion such that the small end portion and the large end portion are coupled with each other by inserting the locking pin through the fixing through-hole via the key groove. The key groove of the reciprocating compressor K3 can be machined more easily than the retaining hole of the reciprocating compressors K1 and K2.

Figure 10:
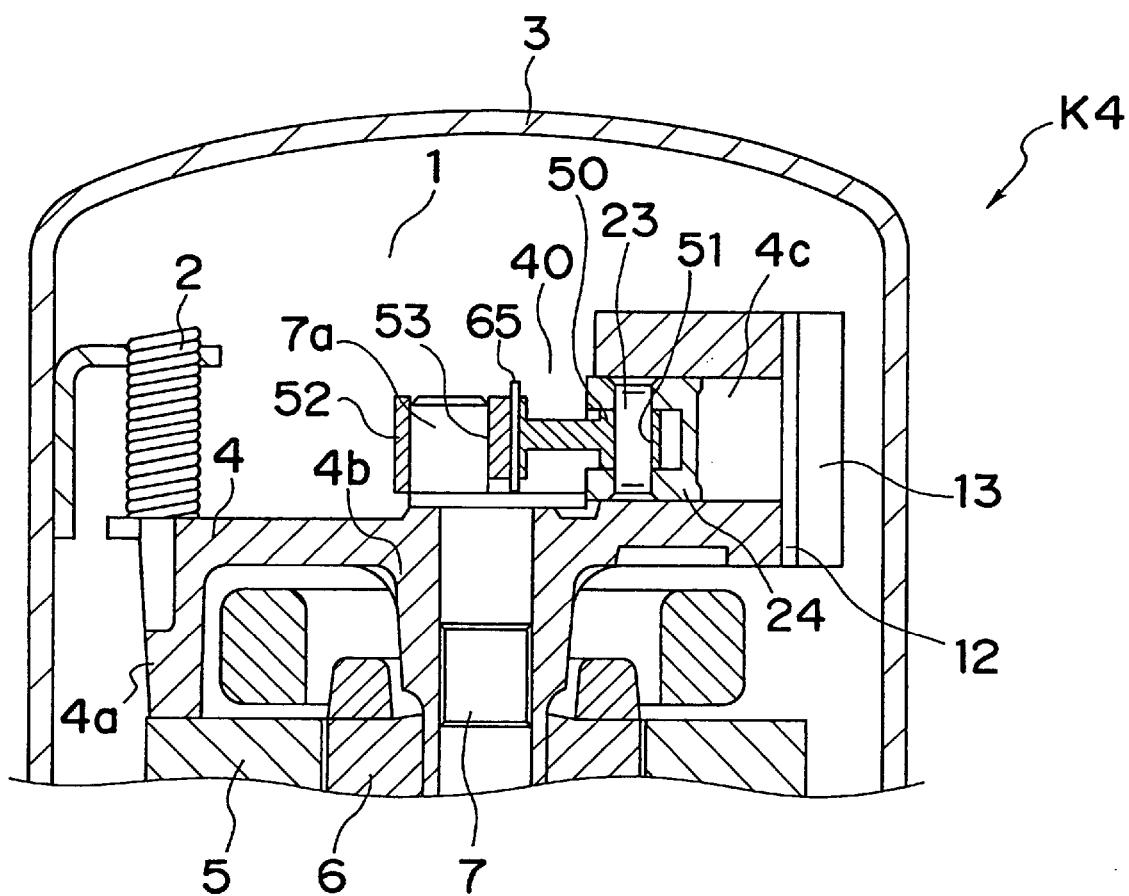
FIG. 10 is a fragmentary sectional view of a reciprocating compressor according to a fourth embodiment of the present invention.

FIG. 10 shows a reciprocating compressor K4 according to a fourth embodiment of the present invention. In the reciprocating compressor K4, a connecting rod 40 includes a small end portion 50 having a small hole 51 and a large end portion 52 having a large hole 53. One end of the connecting rod 40 is coupled with the piston 24 by the piston pin 23 loosely fitted into the small hole 51 of the small end portion 50, while the other end of the connecting rod 40 is coupled with the eccentric shaft 7a by loosely fitting the eccentric shaft 7a into the large hole 53 of the large end portion 52.

Figure 11:
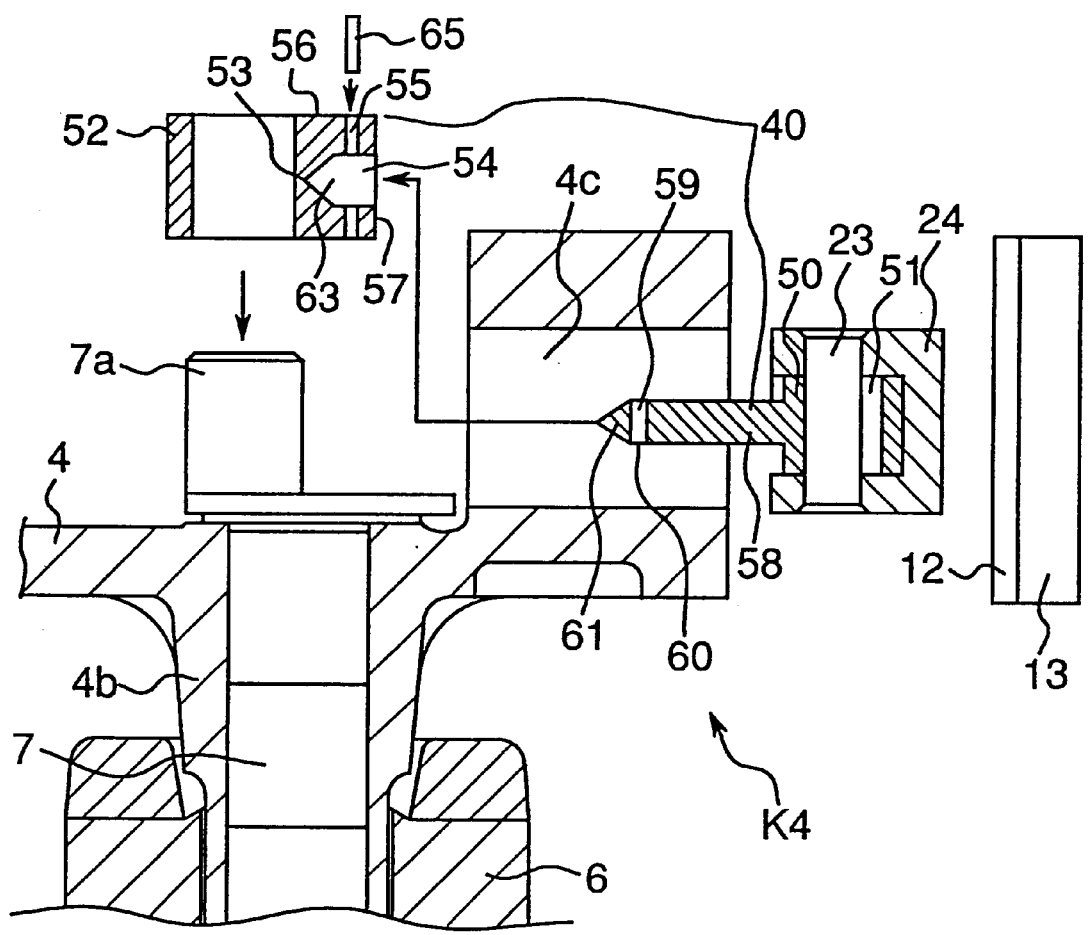
FIG. 11 is a partly sectional exploded view of the reciprocating compressor of FIG. 10, particularly showing a connecting rod and a piston.

In FIG. 11, the piston 24, the piston pin 23 and the small end portion 50 is inserted into the cylinder 4c from one side of the cylinder 4c remote from the crank shaft 7, while the eccentric shaft 7a is inserted into the large hole 53 of the large end portion 52 by lowering the large end portion 52 from above the eccentric shaft 7a.

Figure 12:
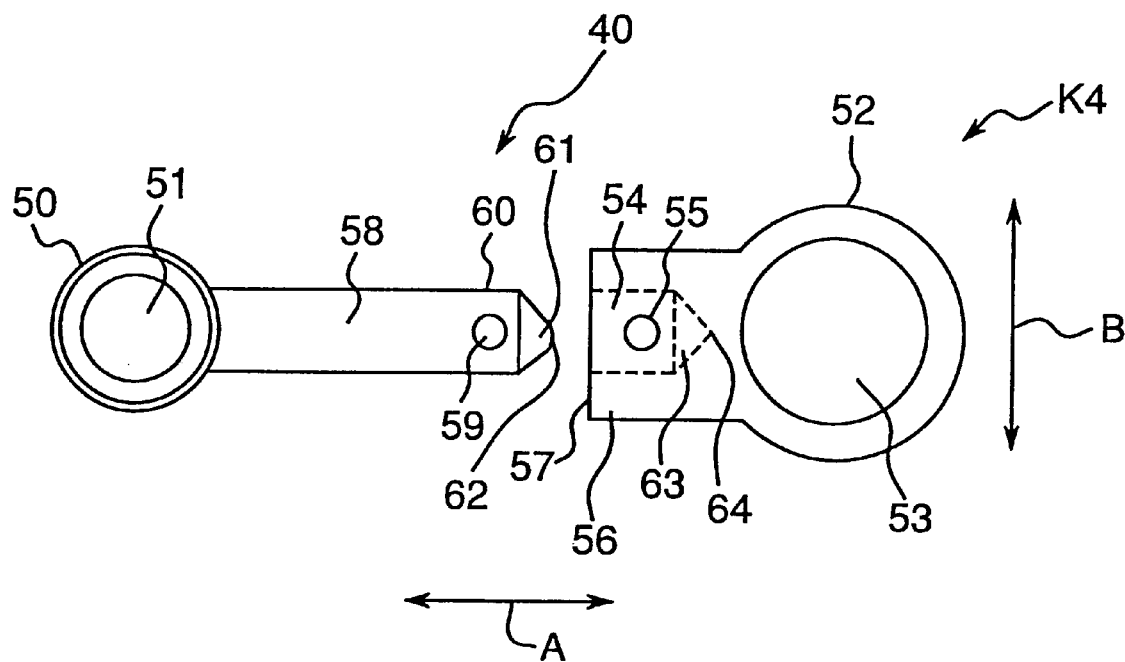
FIG. 12 is a top plan view showing the connecting rod of FIG. 11 prior to its assembly.

As shown in FIG. 12, the large end portion 52 of the connecting rod 40 has a boss 56 and a cylindrical bore 54 is formed on an end face 57 of the boss 56 such that an axis of the cylindrical bore 54 passes through an axis of the large hole 53. A fixing through-hole 55 is formed on the large end portion 52 so as to pierce through the large end portion 52 via the cylindrical bore 54. The cylindrical bore 54 extends orthogonally to the axis of the large hole 53 to such a depth as not to open to the large hole 53. The small end portion 50 includes a rod portion 58 extending radially outwardly from the small hole 51 at right angles to an axis of the small hole 51. A retaining portion 60 is provided at a distal end portion of the rod portion 58 and a retaining through-hole 59 is formed at the retaining portion 60.

Figure 13:
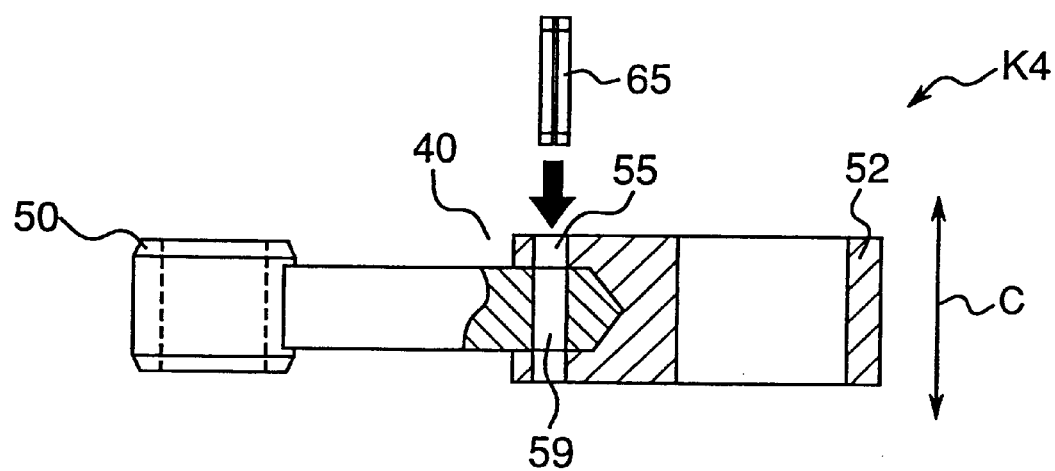
FIG. 13 is a partly sectional front elevational view showing the connecting rod of FIG. 11 during its assembly.

In FIGS. 12 and 13, a hemispherical or substantially conical retaining projection 61 having a rounded retaining tip 62 is provided at a distal end of the retaining portion 60. A hemispherical or substantially conical fixing slot 63 having a tip 64 is formed at a distal end of the cylindrical bore 54. After the retaining portion 60 of the small end portion 50 has been inserted into the cylindrical bore 54 of the large end portion 52, a locking pin 65 is inserted through the fixing through-hole 55 via the retaining through-hole 59 and thus, the small end portion 50 and the large end portion 52 of the connecting rod 40 are securely coupled with each other.

Hereinafter, operation of the reciprocating compressor K4 of the above described arrangement is described. Both of the cylindrical bore 54 of the large end portion 52 and the retaining portion 60 of the small end portion 50, which act as a coupling means between the large end portion 52 and the small end portion 50, are cylindrical and therefore, can be easily machined with high dimensional accuracy. When the retaining portion 60 is loosely fitted into or lightly press fitted into the cylindrical bore 54, the retaining projection 61 disposed at the distal end of the retaining portion 60 is hemispherical or substantially conical, so that the retaining portion 60 is fitted into the cylindrical bore 54 smoothly.

Meanwhile, both of the retaining portion 60 and the cylindrical bore 54 are cylindrical and therefore, can be slightly deflected about axes of the retaining portion 60 and the cylindrical bore 54, respectively. Consequently, such a phenomenon does not happen that it is difficult to insert the retaining portion 60 into the cylindrical bore 54 due to torsion of the axes of the small hole 51 and the large hole 53.

After the retaining portion 60 has been fitted into the cylindrical bore 54, a small clearance is defined between the rounded retaining tip 62 and the tip 64 of the fixing slot 63. At this time, slight assembly oil is held in the clearance.

Subsequently, when the locking pin 65 is inserted through the fixing through-hole 55 via the retaining through-hole 59 of the small end portion 50, the locking pin 65 corrects in an identical axial direction through deformation of the locking pin 65 small torsion of the axes of the small hole 51 and the large hole 53 produced at the time of fitting of the retaining portion 60 into the cylindrical bore 54 so as to fix the retaining portion 60 in the cylindrical bore 54.

Furthermore, if torsion of the axes of the small hole 51 and the large hole 53 is produced due to compressive load, etc. during operation of the reciprocating compressor K4, the locking pin 65 is slightly deformed by this torsion and thus, the reciprocating compressor K4 is well balanced mechanically at a point so as to be stabilized at the well-balanced point.

Meanwhile, the connecting rod 40 converts rotation of the crank shaft 7 into the reciprocation of the piston 24. Therefore, during operation of the reciprocating compressor K4, force is applied from the large end portion 52 to the small end portion 50 through the cylindrical bore 54 and the retaining portion 60 in all directions, i.e., in a longitudinal direction of the arrow A and in a lateral direction of the arrow B in FIG. 12 as well as in a vertical direction of the arrow C in FIG. 13 but slightly. At this time, since the retaining projection 61 of the retaining portion 60 is hemispherical or substantially conical, a surface of the retaining projection 61 faces in all directions. Thus, the axes of the small hole 51 and the large hole 53 are stabilized in an identical direction during operation of the reciprocating compressor K4, so that rotational force of the crank shaft 7 can be transmitted into reciprocation of piston 24 with substantially no loss at the retaining portion 60.

In the above described reciprocating compressor K4, the large end portion 52 of the connecting rod 40 includes the-boss 56 having the cylindrical bore 54 and the fixing through-hole 55 communicating with the cylindrical bore 54, while the bottom of the cylindrical bore 54 hag a hemispherical or substantially conical shape. The cylindrical bore 54 is formed on the end face 57 of the boss 56 and extends radially inwardly towards the axis of the large hole 53 to such a depth as not to open to the large hole 53. The small end portion 50 includes the cylindrical long rod portion 58 extending radially outwardly from the small hole 51. The retaining portion 60 having the retaining through-hole 59 and the hemispherical or substantially conical distal end is provided at the end portion of the rod portion 58. By loosely fitting or lightly press fitting the retaining portion 60 into the cylindrical bore 54 of the boss 56 and inserting the locking pin 65 through the fixing through-hole 55 via the retaining through-hole 59, the retaining portion 60 is fixed in the cylindrical bore 54 such that the axes of the small hole 51 and the large hole 53 of the connecting rod 40 are maintained on an identical plane.

Therefore, the reciprocating compressor K4 can be machined and assembled easily with high precision. In addition, it is possible to prevent drop of efficiency due to increase of rotational load caused by torsion of the axes of the small hole 51 and the large hole 53 as well as increase of noises and vibrations due to abnormal rubbing between the small hole 51 and the piston pin 23, between the large hole 53 and the eccentric shaft 7a and between the retaining portion 60 and the cylindrical bore 54.

Figure 14:
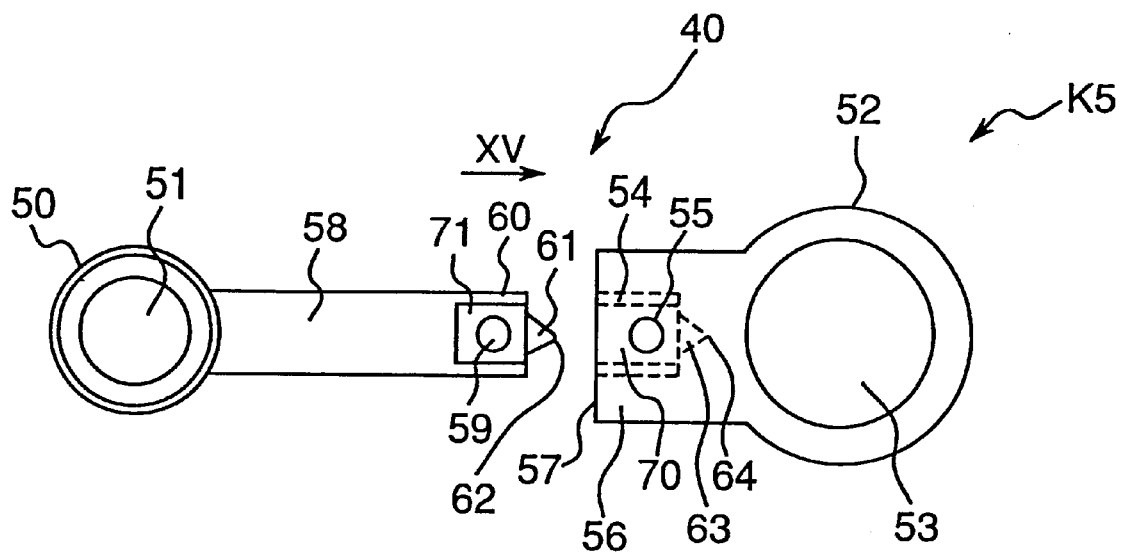
FIG. 14 is a top plan view showing a connecting rod of a reciprocating compressor according to a fifth embodiment of the present invention prior to its assembly.
Figure 15:
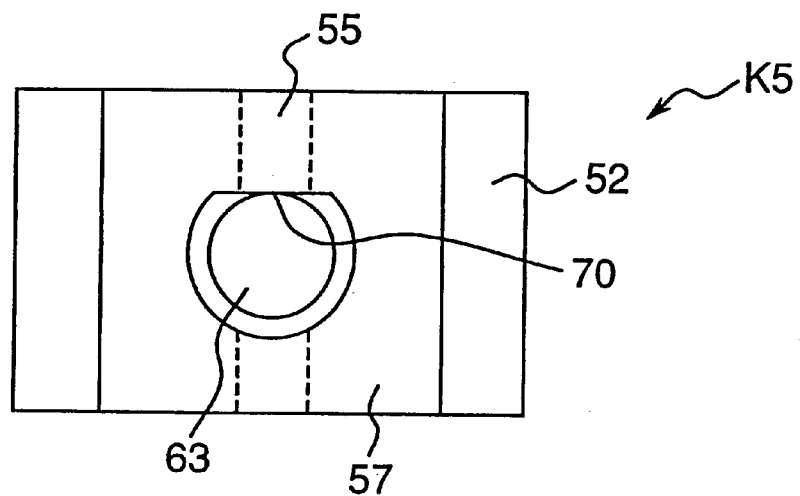
FIG. 15 is an end view as observed in the direction of the arrow XV in FIG. 14, particularly showing a large end portion of the connecting rod of FIG. 14.
Figure 16:
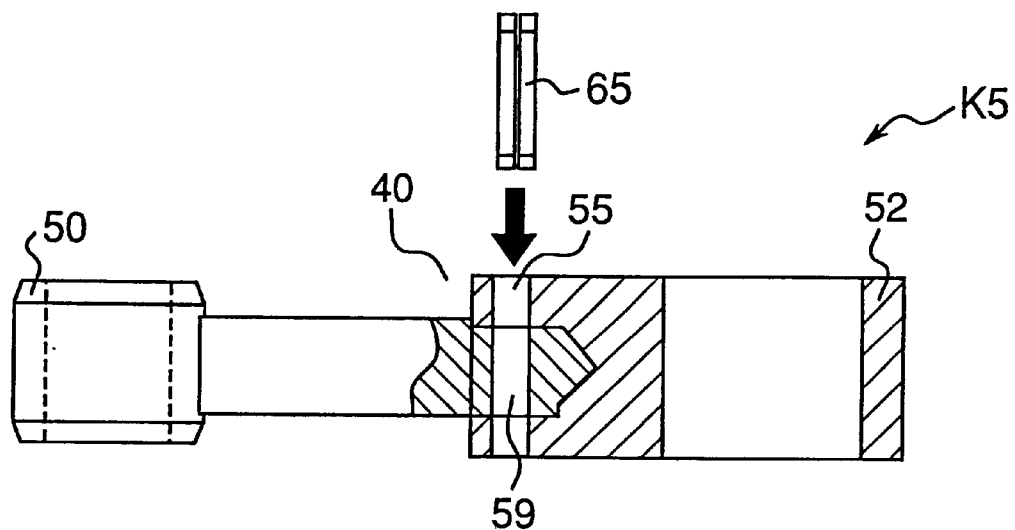
FIG. 16 is a partly sectional front elevational view showing the connecting rod of FIG. 14 during its assembly.

FIGS. 14 to 16 show the connecting rod 40 of a reciprocating compressor K5 according to a fifth embodiment of the present invention. In FIGS. 14 to 16, a flat fixing portion 70 is formed at an periphery of the cylindrical bore 54 of the large end portion 52 so as to extend in an axial direction of the cylindrical bore 54. Since the flat fixing portion 70 is provided on the large end portion 52, a diameter of a base of the fixing slot 63 is made smaller than that of the cylindrical bore 54. Meanwhile, a flat engageable portion 71 is provided on the retaining portion 60 of the small end portion 50 so as to extend in an axial direction of the retaining portion 60. Since the flat engageable portion 71 is provided on the small end portion 50 a diameter of a base of the retaining projection 61 is made smaller than that of the retaining portion 60. Since other constructions of the reciprocating compressor K5 are similar to those of the reciprocating compressor K4, the description is abbreviated for the sake of brevity.

When the retaining portion 60 is fitted into the cylindrical bore 54, the flat engageable portion 71 is brought into engagement with the flat fixing portion 70 so as to function as a positioning guide. Therefore, since the retaining through-hole 59 and the fixing through-hole 55 which are brought out of alignment with each other slightly simultaneously with fitting of the retaining portion 60 into the cylindrical bore 54 are brought into alignment with each other highly accurately, the locking pin 65 can be easily inserted through the fixing through-hole 55 via the retaining through-hole 59.

Meanwhile, since movement of the retaining portion 60 about the axis of the cylindrical bore 54 is regulated by engagement of the flat engageable portion 71 with the flat fixing portion 70, behavior of the connecting rod 40 is stabilized.

In the reciprocating compressor K5, the flat engageable portion 71 is provided on the cylindrical retaining portion 60 of the rod portion 58 and the flat fixing portion 70 is provided on the cylindrical bore 54 of the boss 56 as described above. Therefore, at the time of assembly of the connecting rod 40, the fixing through-hole 55 and the retaining through-hole 59 are brought into alignment with each other highly accurately simultaneously with fitting of the retaining portion 60 into the cylindrical bore 54, so that the locking pin 65 can be easily inserted through the fixing through-hole 55 via the retaining through-hole 59 and thus, the connecting rod 40 can be assembled easily.

Meanwhile, since movement of the retaining portion 60 about the axis of the cylindrical bore 54 is regulated, behavior of the connecting rod 40 can, be stabilized.

Furthermore, in the reciprocating compressor K5, the retaining through-hole 59 is formed on the flat engageable portion 71 and the fixing through-hole 55 is formed on the flat fixing portion 70. However, it is needless to say that the flat engageable portion 71 and the flat fixing portion 70 may be arbitrarily positioned relative to the retaining through-hole 59 and the fixing through-hole 55, respectively.

Figure 17:
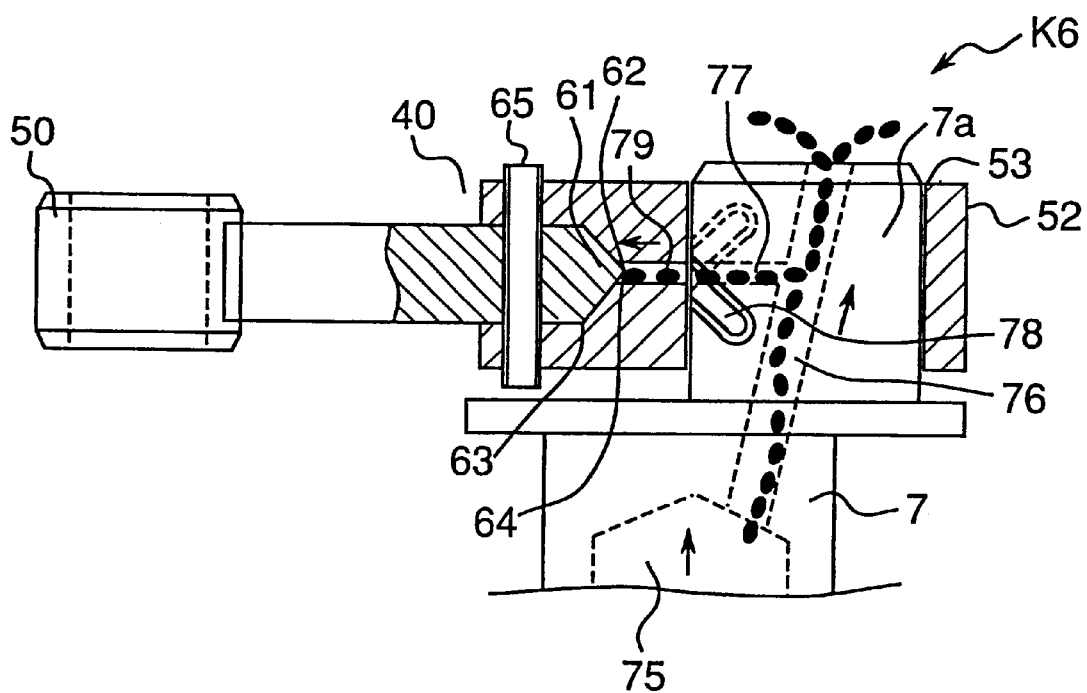
FIG. 17 is a partly sectional fragmentary view of a reciprocating compressor according to a sixth embodiment of the present invention, particularly showing a connecting rod and an eccentric shaft during a suction process.
Figure 18:
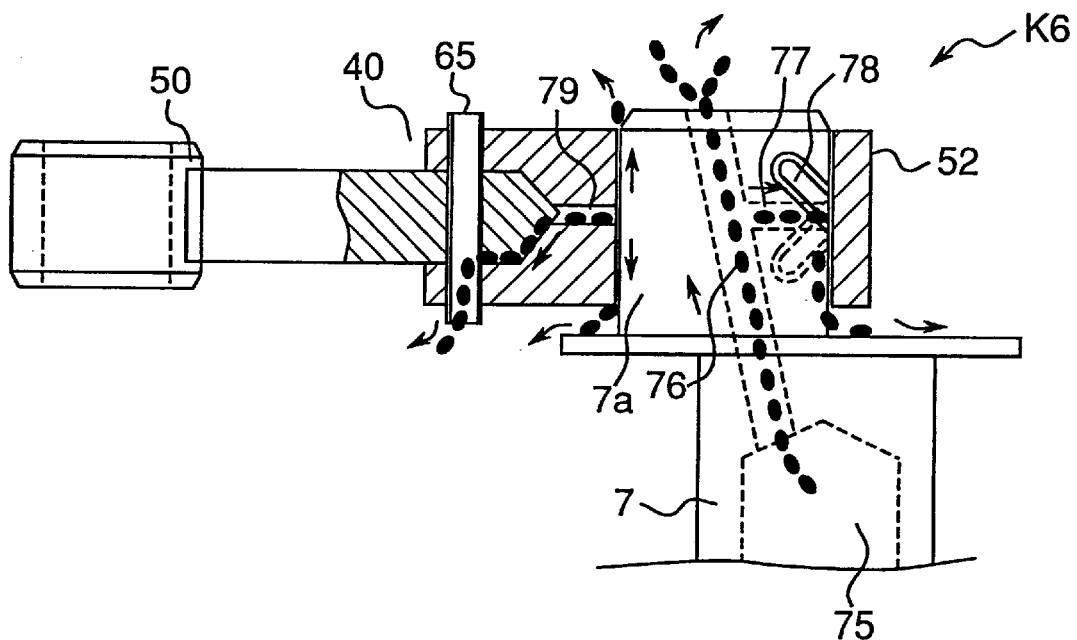
FIG. 18 is a view similar to FIG. 17, particularly showing the connecting rod and the eccentric shaft during a compression process.

FIGS. 17 and 18 show the connecting rod 40 of a reciprocating compressor K6 according to a sixth embodiment of the present invention. In FIGS. 17 and 18, a first oiling hole 75 is provided in the crank shaft 7 and is communicated with a second oiling hole 76 provided in the eccentric shaft 7a. The second oiling hole 76 opens to an upper end face of the eccentric shaft 7a. A lateral oil hole 77 extends radially outwardly from the second oiling hole 76 so as to be communicated with an oil groove 78 formed on an outer periphery of the eccentric shaft 7a. The lateral oil hole 77 and the oil groove 78 are disposed at one side of the eccentric shaft 7a adjacent to an axis of the crank shaft 7. A communication oil hole 79 extends through the boss 56 of the large end portion 52 so as to communicate the tip 64 of the fixing slot 63 and the large hole 53 with each other. Since other constructions of the reciprocating compressor K6 are similar to those of the reciprocating compressor K4, the description is abbreviated for the sake of brevity.

Hereinafter, operation of the reciprocating compressor K6 of the above described arrangement is described. In FIGS. 17 and 18, black dots represents oil particles and arrows indicates flow of oil. FIG. 17 corresponds to a suction process of the reciprocating compressor K6, while FIG. 18 corresponds to a compression process of the reciprocating compressor K6.

During the suction process of the reciprocating compressor K6, lubricating oil (not shown) collected at a bottom of the housing 3 is pushed upwardly to the second oiling hole 76 by centrifugal pump action of the first oiling hole 75 of the crank shaft 7 in response to rotation of the reciprocating compressor K6. Then, the oil particles are introduced from the second oiling hole 76 to the oil groove 78 through the lateral oil hole 77 by centrifugal force produced by rotation of the eccentric shaft 7a. Meanwhile, a portion of the oil particles is discharged from the upper end face of the eccentric shaft 7a into the housing 3.

Therefore, during the suction process of the reciprocating compressor K6 as shown in FIG. 17, since the oil groove 78 is disposed at one side of the eccentric shaft 7a adjacent to the axis of the crank shaft 7, the oil groove 78 is communicated with the communication oil hole 79 formed on the large end portion 52 of the connecting rod 40. Furthermore, the small end portion 50 is pulled leftwards in FIG. 17, while the large end portion 52 is pulled rightwards in FIG. 17. As a result, a small gap is produced between the retaining projection 61 and the fixing slot 63. Therefore, the oil particles which have reached the oil groove 78 by centrifugal force pass through the communication oil hole 79 without losing their inertia force so as to be carried to the small gap between the retaining projection 61 and the fixing slot 63.

Meanwhile, during the compression process of FIG. 18, the oil groove 78 is not communicated with the communication oil hole 79 and the retaining projection 61 and the fixing slot 63 are subjected to compressive load from the small end portion 50 so as to depress each other. As a result, the oil particles delivered into the small gap between the retaining projection 61 and the fixing slot 63 during the suction process are squeezed between the retaining projection 61 and the fixing slot 63 and thus, flow to the locking pin 65 through a minute gap or flow backwardly in the communication oil hole 79 so as to be discharged from upper and lower end portions of the eccentric shaft 7a. Meanwhile, the oil particles drawn into the oil groove 78 via the lateral oil hole 77 act as lubricating-oil between the large hole 53 and the eccentric shaft 7a.

Consequently, the lubricating oil is sufficiently supplied to the retaining projection 61 and the fixing slot 63, which act as a coupling means of the connecting rod 40. Furthermore, since the lubricating oil is circulated, the lubricating oil serves also to cool vicinity of the coupling means of the connecting rod 40. Accordingly, sliding loss of the connecting rod 40 is lessened and wear of the connecting rod 40 due to metallic contact between the retaining projection 61 and the fixing slot 63 can be reduced.

In the reciprocating compressor K6, since the communication oil hole 79 is provided so as to communicate the large hole 53 and the tip 64 of the fixing slot 63 with each other and is communicated with the oil groove 78 of the eccentric shaft 7a as described above, the lubricating oil can be sufficiently supplied to the retaining projection 61 and the fixing slot 63, which act as the coupling means of the connecting rod 40. Therefore, sliding loss of the connecting rod 40 is lessened and wear of the connecting rod 40 due to metallic contact between the retaining projection 61 and the fixing slot 63 can be reduced.

Meanwhile, in the reciprocating compressor K6, the oil groove 78 and the communication oil groove 79 are communicated with each other during the suction process. However, the oil groove 78 and the communication oil groove 79 may also be communicated with each other during other processes or at all times.

Figure 19:
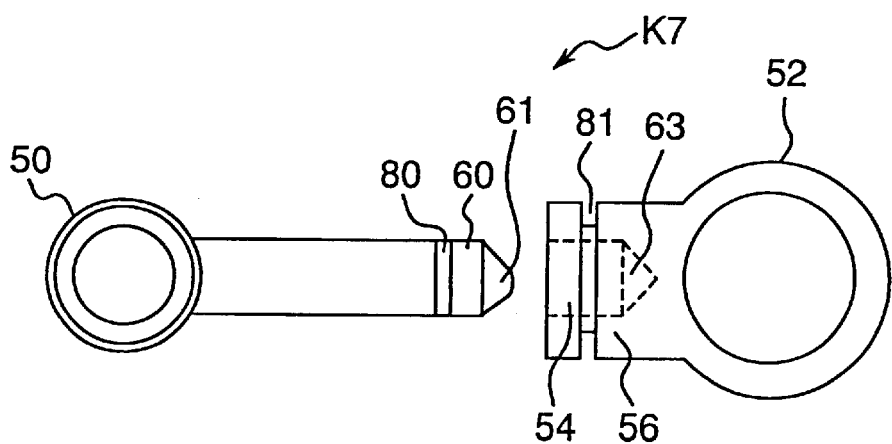
FIG. 19 is a top plan view showing a connecting rod of a reciprocating compressor according to a seventh embodiment of the present invention prior to its assembly.
Figure 20:
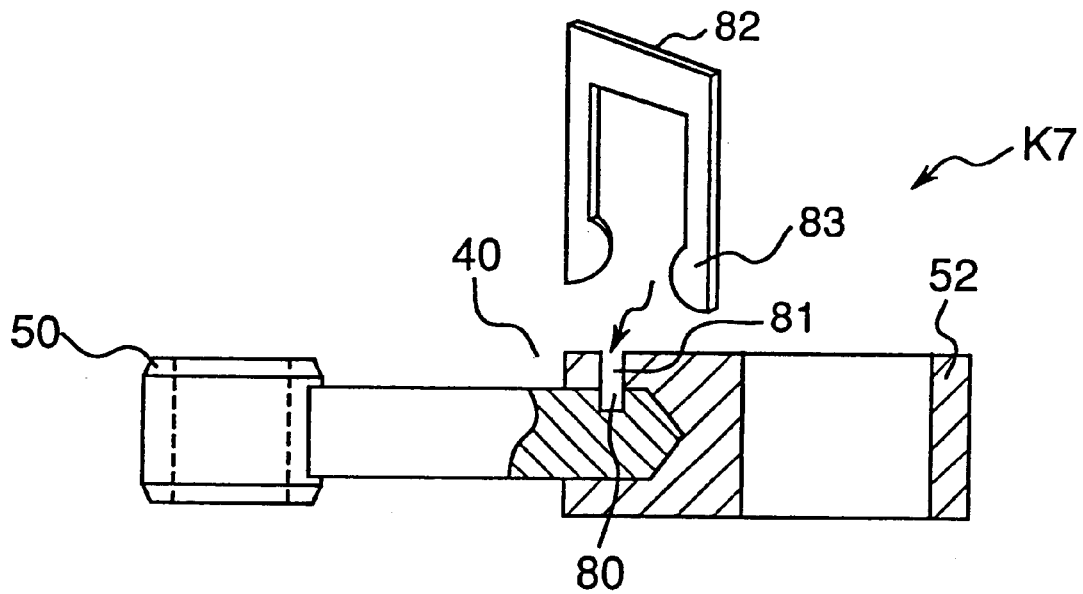
FIG. 20 is a partly sectional front elevational view showing the connecting rod of FIG. 19 during its assembly.

FIGS. 19 and 20 show the connecting rod 40 of a reciprocating compressor K1 according to a seventh embodiment of the present invention. In FIGS. 19 and 20, a retaining groove 80 is formed on an outer periphery of the cylindrical retaining portion 60 of the small end portion 50, while a fixing groove 81 is formed on the boss 56 of the large end portion 52 so as to be partially communicated with the cylindrical bore 54. A substantially U-shaped fixing plate 82 for fixing the retaining portion 60 to the cylindrical bore 54 includes a pair of legs and a hook 83 is provided at a distal end of each of the legs. Since other constructions of the reciprocating compressor K7 are similar to those of the reciprocating compressor K4, the description is abbreviated for the sake of brevity.

Hereinafter, operation of the reciprocating compressor K7 of the above described arrangement is described. When the retaining portion 60 has been fitted into the cylindrical bore 54, the retaining groove 80 and the fixing groove 81 coincide in position with each other. Then, the fixing plate 82 is inserted from the fixing groove 81 through the retaining groove 80 such that the hooks 83 of the fixing plate 82 embrace the boss 56 of the is large end portion 52. As a result, the retaining portion 60 is depressed against the bottom of the cylindrical bore 54 so as to be secured in position.

Therefore, since load otherwise born by the retaining projection 61 and the fixing slot 63 is almost born by the fixing plate 82, coupling between the small end portion 50 and the large end portion 52 of the connecting rod 40 can be strengthened, thereby resulting in stable behavior of the connecting rod 40.

Accordingly, in the reciprocating compressor K7, the retaining groove 80 is formed on the outer periphery of the retaining portion 60 of the small end portion 50 and the fixing groove 81 is formed on the boss 56 of the large end portion 52 so as to be communicated with the cylindrical bore 54. Thus, after the retaining portion 60 has been fitted into the cylindrical bore 54, the fixing plate 82 having the hooks 83 formed at the distal end of each of the legs is inserted from the fixing groove 81 through the retaining groove 80 so as to securely couple the small end portion 50 and the large end portion 52 with each other. Consequently, since the retaining portion 60 is securely fixed to the cylindrical bore 54, almost all loads applied to the connecting rod 40 during operation of the reciprocating compressor K7 are born by the fixing plate 82 and thus, behavior of the connecting rod 40 can be stabilized.

Figure 21:
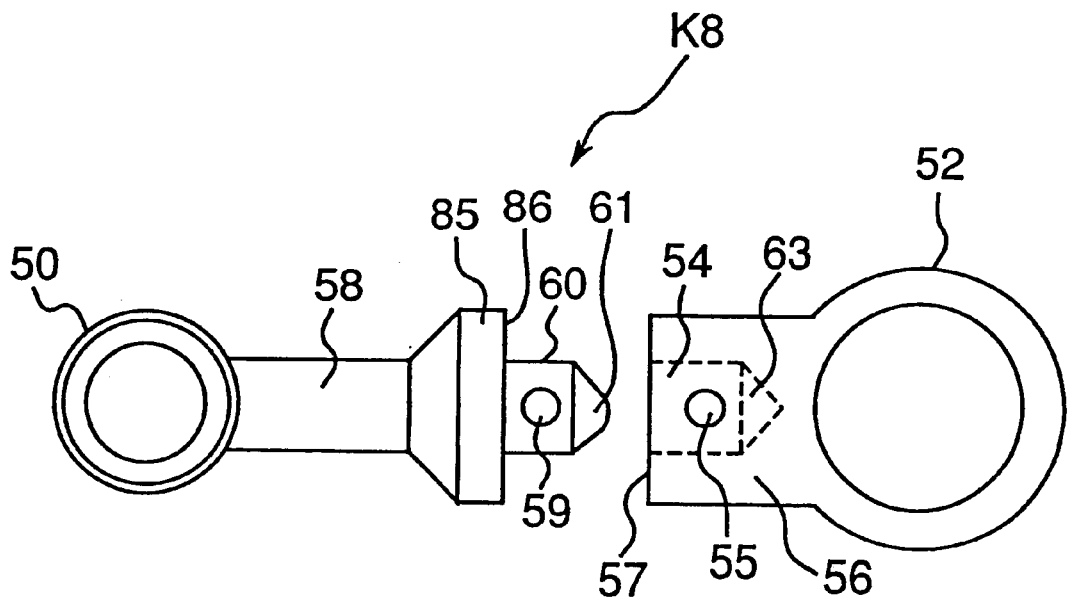
FIG. 21 is a top plan view showing a connecting rod of a reciprocating compressor according to an eighth embodiment of the present invention prior to its assembly.
Figure 22:
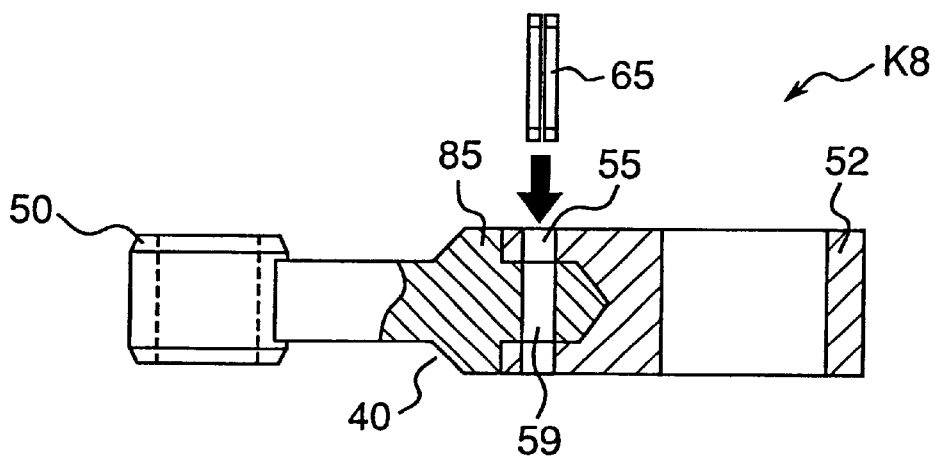
FIG. 22 is a partly sectional front elevational view showing the connecting rod of FIG. 21 during its assembly.

FIGS. 21 and 22 show the connecting rod 40 of a reciprocating compressor KB according to an eighth embodiment of the present invention. In FIGS. 21 and 22, a holder portion 85 is provided between the rod portion 58 and the retaining portion 60 of the small end portion 50 and includes an auxiliary flat portion 86 having a flat surface confronting the end face 57 of the boss 56 of the large end portion 52. Since other constructions of the reciprocating compressor K8 are similar to those of the reciprocating compressor K4, the description is abbreviated for the sake of brevity.

Hereinafter, operation of the reciprocating compressor K8 of the above described arrangement is described. When the retaining portion 60 has been fitted into the cylindrical bore 54, the auxiliary flat portion 86 is brought into contact with the end face 57 of the boss 56. As a result, since a distance for fitting the retaining portion 60 into the cylindrical bore 54 can be determined, the locking pin 65 can be simply inserted through the fixing through-hole 55 and the retaining through-hole 59 and thus, the connecting rod 40 can be assembled.

Meanwhile, since load applied to the connecting rod 40 during a compression process of the reciprocating compressor K8 can be born by the auxiliary flat portion 86, behavior of the connecting rod 40 can be stabilized.

Accordingly, in the reciprocating compressor K8, since the holder portion 85 having the auxiliary flat portion 86 confronting the end face 57 of the boss 56 is provided between the retaining portion 60 and the rod portion 58, the distance for fitting the retaining portion 60 into the cylindrical bore 54 can be determined and thus, the connecting rod 40 can be assembled simply. In addition, sinde load produced during the compression process is born by the auxiliary flat portion 86, behavior of the connecting rod 40 can be stabilized.

Meanwhile, in the reciprocating compressor K8, the retaining projection 61 and the fixing slot 63 are provided but may also be eliminated.

Figure 23:
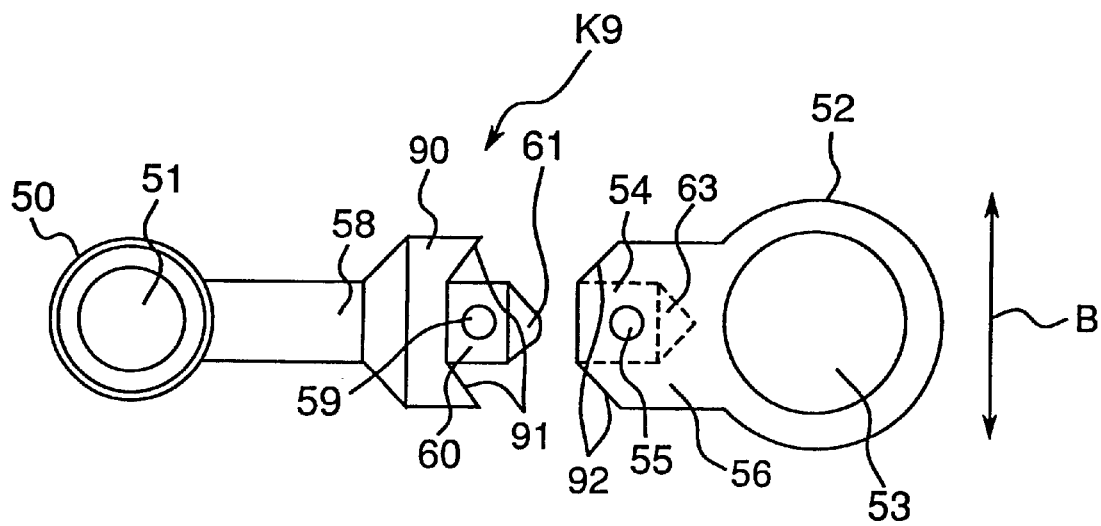
FIG. 23 is a top plan view showing a connecting rod of a reciprocating compressor according to a ninth embodiment of the present invention prior to its assembly.
Figure 24:
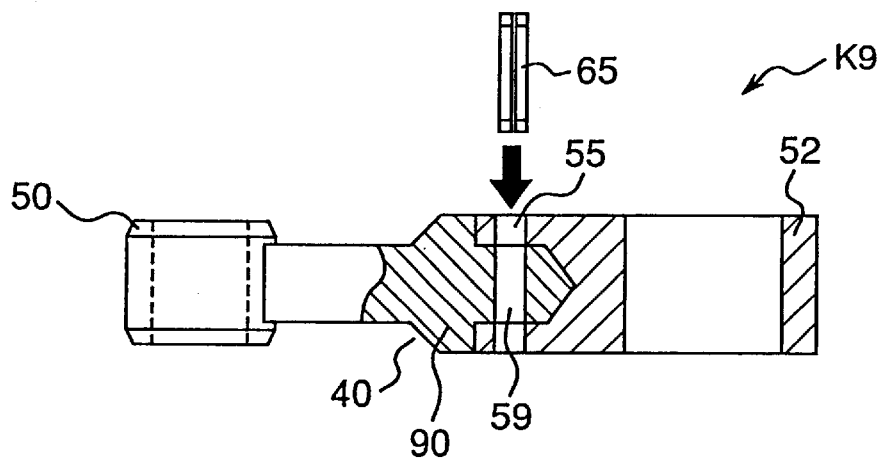
FIG. 24 is a partly sectional front elevational view showing the connecting rod of FIG. 23 during its assembly.

FIGS. 23 and 24 show the connecting rod 40 of a reciprocating compressor K9 according to a ninth embodiment of the present invention. In FIGS. 23 and 24, a second retaining projection 90 is provided between the rod portion 58 and the retaining portion 60 of the small end portion 50 and has a pair of retaining end faces 91 extending in parallel with the axis of the small hole 51. Meanwhile, the boss 56 of the large end portion 52 has a pair of fixing end faces 92 extending in parallel with the axis of the large hole 53 and confronting the retaining end faces 91, respectively.

Hereinafter, operation of the reciprocating compressor K9 of the above described arrangement is described. When the retaining portion 60 has been fitted into the cylindrical bore 54, the retaining end faces 91 are brought into contact with the fixing end faces 92 so as to determine a distance for fitting the retaining portion 60 into the cylindrical bore 54 and lateral position of the retaining portion 60, so that the fixing through-hole 55 and the retaining through-hole 59 are brought into alignment with each other highly accurately. As a result, since the locking pin 65 can be inserted through the fixing through-hole 55 via the retaining through-hole 59, the connecting rod 40 can be assembled easily.

Meanwhile, since the second retaining projection 90 prevents the small end portion 50 and the large end portion 52 from deviating laterally or about the axis of the retaining portion 60, coupling between the small end portion 50 and the large end portion 52 of the connecting rod 40 can be strengthened and thus, behavior of the connecting rod 40 can be stabilized.

Accordingly, in the reciprocating compressor K9, the second retaining projection 90 having the retaining end faces 91 extending in parallel with the axis of the small hole 51 is provided between the retaining portion 60 and the rod portion 58 of the small end portion 50, while the fixing end faces 92 extending in parallel-with the axis of the large hole 53 are provided on the boss 56 of the large end portion 52. Therefore, when the retaining portion 60 has been fitted into the cylindrical bore 54, the retaining end faces 91 are brought into contact with the fixing end faces 92, respectively, so that the retaining through-hole 59 and the fixing through-hole 55 can be brought into alignment with each other highly accurately and thus, the connecting rod 40 can be assembled easily. Meanwhile, since the small end portion 50 and the large end portion 52 can be securely fixed laterally or about the axis of the retaining portion 60, behavior of the connecting rod 40 can be stabilized.

Meanwhile, in the reciprocating compressor K9, the retaining projection 60 and the fixing slot 63 are provided but may also be eliminated.

As is clear from the foregoing, the reciprocating compressors K4 to K6 comprise: the connecting rod which includes the small end portion and the large end portion; wherein the small end portion has the small hole and is coupled with the piston at the small hole by the piston pin, while the large end portion has the large hole and is coupled with the eccentric shaft of the crank shaft at the large hole; wherein the large end portion includes the boss having the cylindrical bore and the fixing hole communicating with the cylindrical bore and the cylindrical bore has the hemispherical or substantially conical bottom; wherein the cylindrical bore extends from the end face of the boss towards the center of the large hole to such a depth as not to open to the large hole; wherein the small end portion includes the cylindrical rod portion extending radially outwardly from the small hole and the rod portion is provided, at its one end portion, with the retaining hole and the retaining portion having the hemispherical or substantially conical distal end; wherein when the retaining portion is loosely fitted into or lightly press fitted into the cylindrical bore of the boss and the locking pin is inserted through the fixing hole and the retaining hole, the retaining portion is fixed in the cylindrical bore and the axes of the small hole of the small end portion and the large hole of the large end portion are disposed as to be maintained on an identical plane.

Therefore, in the reciprocating compressors K4 to K6, since not only machining and assembly can be performed easily with high precision but torsion of the small hole and the small hole and abnormal rubbing of the fitting members against the small hole and the large hole can be prevented, it is possible to prevent drop of efficiency due to increase of rotational load as well as increase of noises and vibrations.

Meanwhile, in the reciprocating compressor K5, since the flat engageable portion and the flat fixing portion are, respectively, provided on the cylindrical retaining portion of the rod portion and the cylindrical bore of the boss, the retaining portion can be positioned when the retaining portion is fitted into the cylindrical bore and thus, the connecting rod can be assembled highly accurately. In addition, rotation of the retaining portion is prevented through engagement of the flat engageable portion with the flat fixing portion. Therefore, in the reciprocating compressor K5, it is possible to prevent drop of efficiency due to increase of rotational load as well as increase of noises and vibrations.

Furthermore, in the reciprocating compressor K6, since the oil hole for communicating the tip of the bottom of the cylindrical bore and the large hole with each other is formed on the large end portion and is communicated with the oil groove of the eccentric shaft of the crank shaft, lubricating oil can be sufficiently supplied to the retaining portion and the cylindrical bore, so that wear of the retaining portion and the cylindrical bore due to metallic contact therebetween can be reduced, thereby resulting in improvement of reliability.

Meanwhile, in the reciprocating compressor K7, the retaining groove and the fixing groove are, respectively, provided on the cylindrical retaining portion of the rod portion and the boss. Therefore, when the retaining groove of the rod portion is loosely fitted into or lightly press fitted into the cylindrical bore of the boss and the fixing plate is fitted from the fixing groove through the retaining groove, the retaining portion is retained in the cylindrical bore. Furthermore, by maintaining the axes of the small hole and the large hole on an identical plane, coupling between the retaining portion and the cylindrical bore can be strengthened by the fixing plate and thus, behavior of the connecting rod can be stabilized. As a result, in the reciprocating compressor K7, it is possible to reduce drop of efficiency caused by increase of rotational load of the reciprocating compressor K7 due to loosening of coupling between the retaining portion and the cylindrical portion as well as increase of noises and vibrations.

Meanwhile, in the reciprocating compressor K8, the holder portion is provided between the rod portion and the retaining portion and the auxiliary flat portion of the holder portion is brought into contact with the end face of the boss at the time the retaining portion is fitted into the cylindrical bore. Therefore, in the reciprocating compressor K8, the retaining portion 60 can be coupled with the cylindrical bore efficiently. Furthermore, since load produced during compression can be scattered by the auxiliary flat portion and the end face of the boss, behavior of the connecting rod can be stabilized. As a result, in the reciprocating compressor K8, it is possible to reduce drop of efficiency due to increase of rotational load of the reciprocating compressor K8 as well as increase of noises and vibrations.

Moreover, in the reciprocating compressor K9, the second retaining projection having the retaining end faces extending in parallel with the axis of the small hole is provided between the rod portion and the retaining portion and the fixing end faces extending in parallel with the large hole are provided on the boss of the large end portion. Therefore, when the small end portion and the large end portion are coupled with each other, the retaining end faces 91 are brought into contact with the fixing end faces 92 so as to determine fitting position between the small end portion and the large end portion. Consequently, since the retaining portion and the cylindrical bore can be coupled with each other highly accurately, assembly of the connecting rod is improved. Furthermore, since the connecting rod is prevented from deviating laterally or about the axis of the retaining portion of the connecting rod, behavior of the connecting rod is stabilized. As a result, in the reciprocating compressor K9, it is possible to reduce drop of efficiency due to increase of rotational load as well as increase of noises and vibrations.

Figure 25:
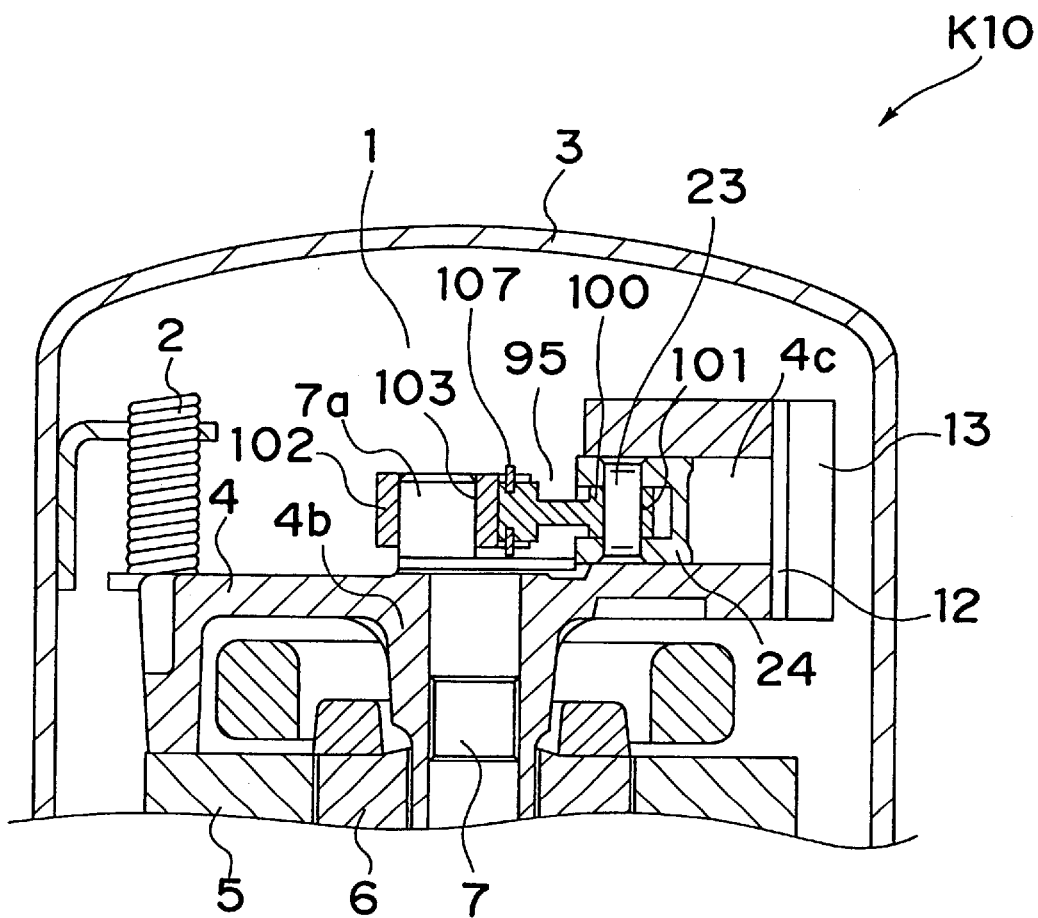
FIG. 25 is a partly sectional fragmentary view of a reciprocating compressor according to a tenth embodiment of the present invention.

FIGS. 25 to 28 show a reciprocating compressor K10 according to a tenth embodiment of the present invention. In FIG. 25, a connecting rod 95 includes a small end portion 100 disposed at its one end and a large end portion 102 disposed at the other end. The small end portion 100 has a small hole 101 and is coupled with the piston 24 by the piston pin 23 loosely fitted into the small hole 101, while the large end portion 102 has a large hole 103 and is coupled with the crank shaft 7a of the crank shaft 7, which is loosely fitted into the large hole 103. A dovetail 104 is provided at one end of a rod 106 of the small end portion 100, while a dovetail groove 105 is formed on the large end portion 102 so as to receive the dovetail 104.

Figure 27:
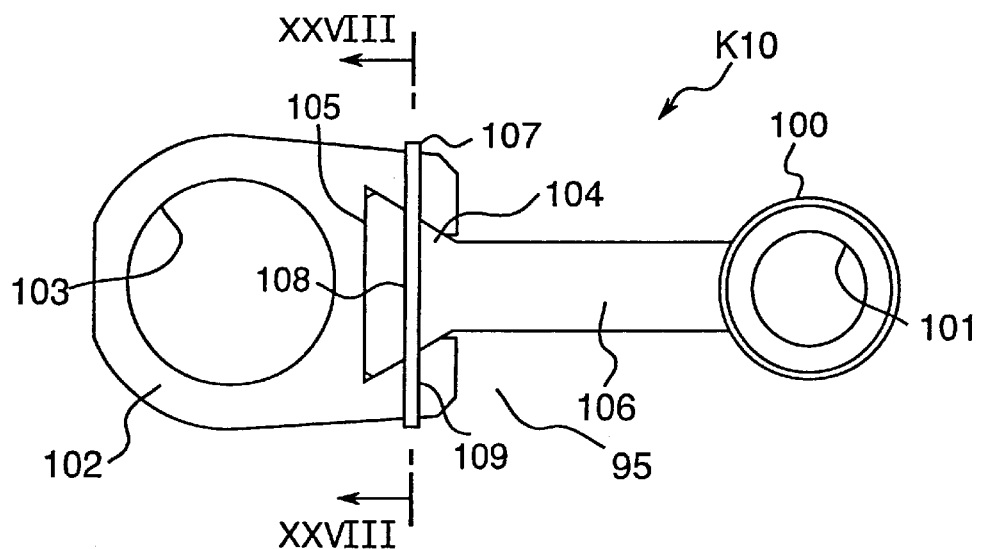
FIG. 27 is a top plan view of a connecting rod of the reciprocating compressor of FIG. 25.
Figure 28:
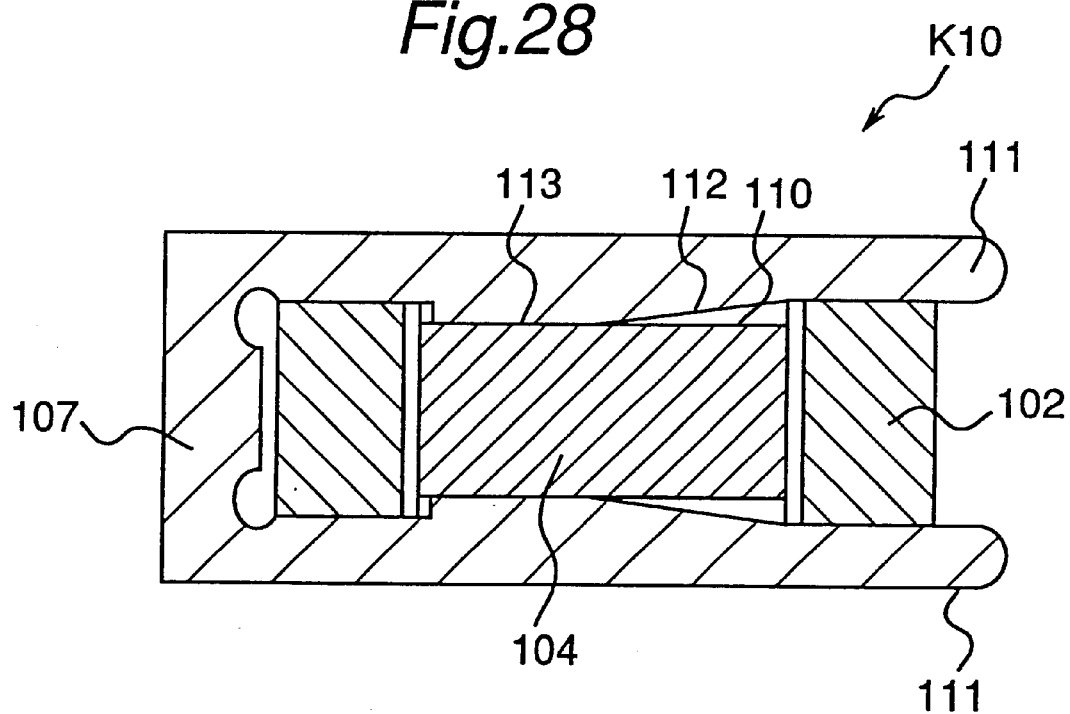
FIG. 28 is a sectional view taken along the line XXVIII—XXVIII in FIG. 27.

A clamp 107 for preventing vertical movement of the small end portion 100 and the large end portion 102 in FIG. 25 is horizontally inserted into engageable slots 109 formed on upper and lower faces of the large end portion 102 and engageable recesses 108 formed on upper and lower faces of the dovetail 104 of the small end portion 100 so as to stretch over the large end portion 102 and the dovetail 104 of the small end portion 100 as shown in FIG. 27. When the clamp 107 has been fitted into the engageable slots 109 and the engageable recesses 108 as shown in FIG. 28, the engageable slots 109 and the engageable recesses 108 have different depths so as to form a step 110. In this embodiment, the engageable slot 109 is made shallower than the engageable recess 108 as shown in FIG. 28.

The clamp 107 has a substantially U-shaped configuration and includes a pair of retaining legs 111. An oblique portion 112 and a flat portion 113 are sequentially formed on each of opposed edges of the retaining legs 111 so as to not only prevent the clamp 107 by the step 110 from being detached from the large end portion 102 but prevent vertical movement of the large end portion 102 and the small end portion 100.

Figure 26:
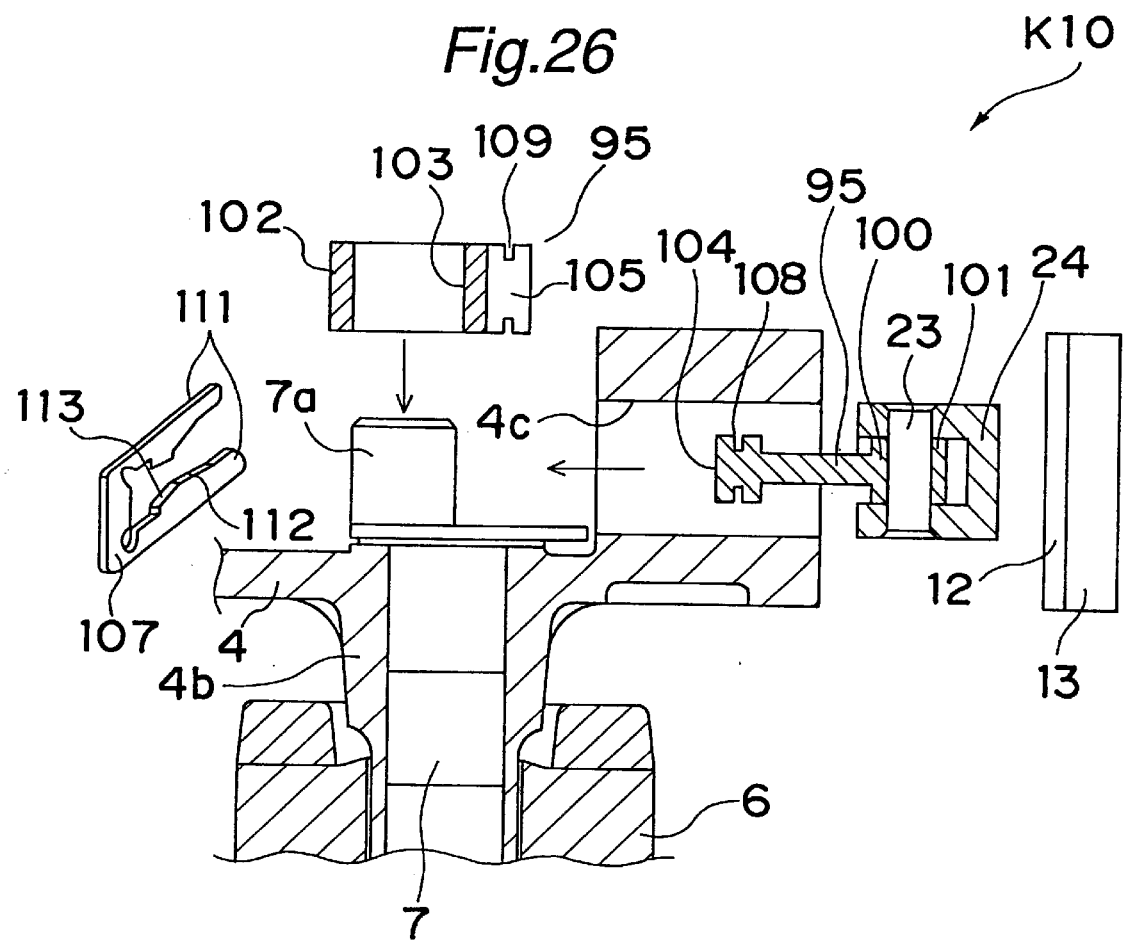
FIG. 26 is a fragmentary exploded view of the reciprocating compressor of FIG. 25.

Hereinafter, assembly steps of the reciprocating compressor K10 of the above described arrangement are described with reference to FIG. 26. The crank shaft 7 is preliminary mounted in the crank case 4 and an assembly in which the small end portion 100 is coupled with the piston 24 by the piston pin 23 is inserted into the cylinder 4c as shown. Then, the crank shaft 7a of the crank shaft 7 is inserted into the large hole 103 and the dovetail 104 is inserted into the dovetail groove 105. Subsequently, the clamp 107 is press fitted into the engageable slots 109 and the engageable recesses 108 horizontally and thus, assembly of the reciprocating compressor K10 is completed.

In the above described arrangement of the reciprocating compressor K10, the small end portion 100 and the large end portion 102 are positively coupled with each other securely in a stroke direction of the piston 24 through engagement of the dovetail 104 with the dovetail groove 105 and are prevented by the clamp 107 from being moved vertically. Furthermore, since a clearance of, for example, about 5 to 20 μms for permitting the dovetail 104 to be fitted into the dovetail groove 105 is provided between the dovetail 104 and the dovetail groove 105, error not only in parallelism between the small hole 101 and the large hole 103 but in orthogonality between the eccentric shaft 7a and the cylinder 4c is reduced, so that extremely high dimensional accuracy is not required and abnormal rubbing between the components can be prevented. As a result, loss in mechanical slide and rotational loss can be reduced.

Figure 29:
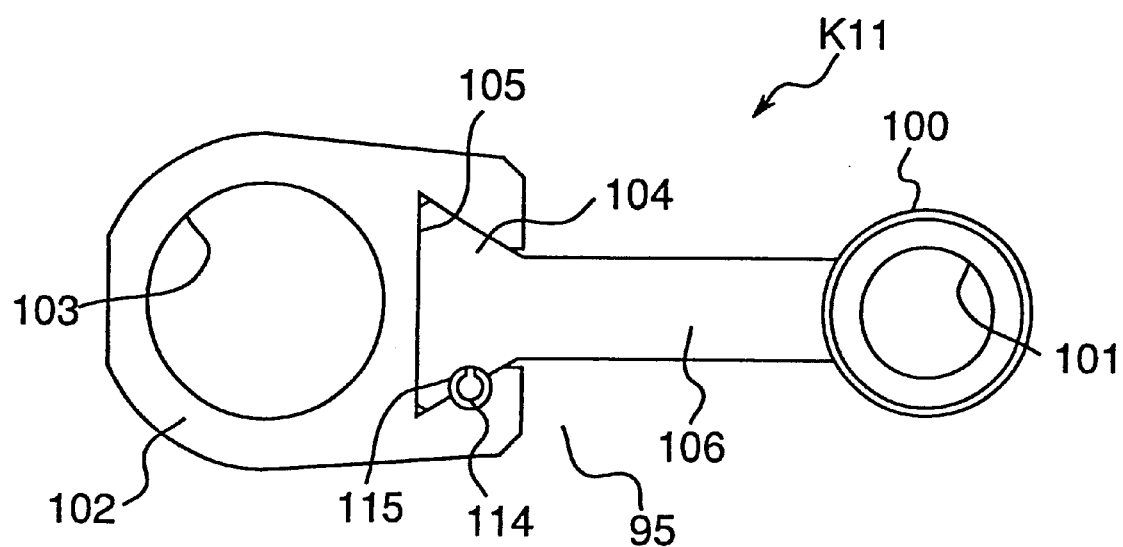
FIG. 29 is a top plan view of a connecting rod of a reciprocating compressor according to an eleventh embodiment of the present invention.

FIG. 29 shows the connecting rod 95 of a reciprocating compressor K11 according to an eleventh embodiment of the present invention. A pin hole 115 is formed at a boundary between the dovetail 104 and the dovetail groove 105. A press fitting pin 114 having a C-shaped or spiral cross section is press fitted into the pin 62 hole 115. In this embodiment, a center of the pin hole 115 is positioned substantially at the boundary between the dovetail 104 and the dovetail groove 105. However, the center of the pin hole 115 may also be positioned so as to sightly deviate from the boundary between the dovetail 104 and the dovetail groove 105 such that the press fitting pin 114 presses one of the dovetail 104 and the large end portion 102 against the other of the dovetail 104 and the large end portion 102. Since other constructions of the reciprocating compressor K11 are similar to those of the reciprocating compressor K10, the description is abbreviated for the sake of brevity.

In the above mentioned arrangement of the reciprocating compressor K11, the press fitting pin 114 functions to elastically reduce a clearance between the dovetail 104 and the dovetail groove 105. Furthermore, since a function of preventing abnormal rubbing between the components is secured by elasticity of the press fitting pin 114, machining accuracy can be further lowered and thus, productivity can be raised. In addition, since self-alignment between the dovetail 104 and the dovetail groove 105 is performed elastically by press fitting the press fitting pin 114 into the pin hole 115, vibrations are damped in the minute clearance between the dovetail 104 and the dovetail groove 105 and noises can be reduced.

In the reciprocating compressors K10 and K11, the small end portion and the large end portion of the connecting rod are coupled with each other by the dovetail and the dovetail groove and vertical movement of the small end portion and the large end portion is prevented by the clamp. Since machining errors can be eliminated by the minute clearance between the dovetail and the dovetail groove, machining is facilitated and abnormal rubbing between the components is reduced during operation, so that loss in rotation and slide can be lessened.

In the reciprocating compressors K10 and K11, the step is formed between the small end portion and the large end portion at the engageable slots and the engageable recesses. Therefore, by inserting the clamp into the engageable slots and the engageable recesses, the clamp is prevented by the step from being detached from the large end portion so as to be supported positively, thereby resulting in improvement of assembly.

In addition, in the reciprocating compressor K11, by press fitting the press fitting pin into the pin hole formed at the boundary between the dovetail and the dovetail groove, self-alignment between the dovetail and the dovetail groove is performed such that the dovetail is held in close contact with the dovetail groove, so that minute vibrations can be restrained and noises can be reduced.

Figure 30:
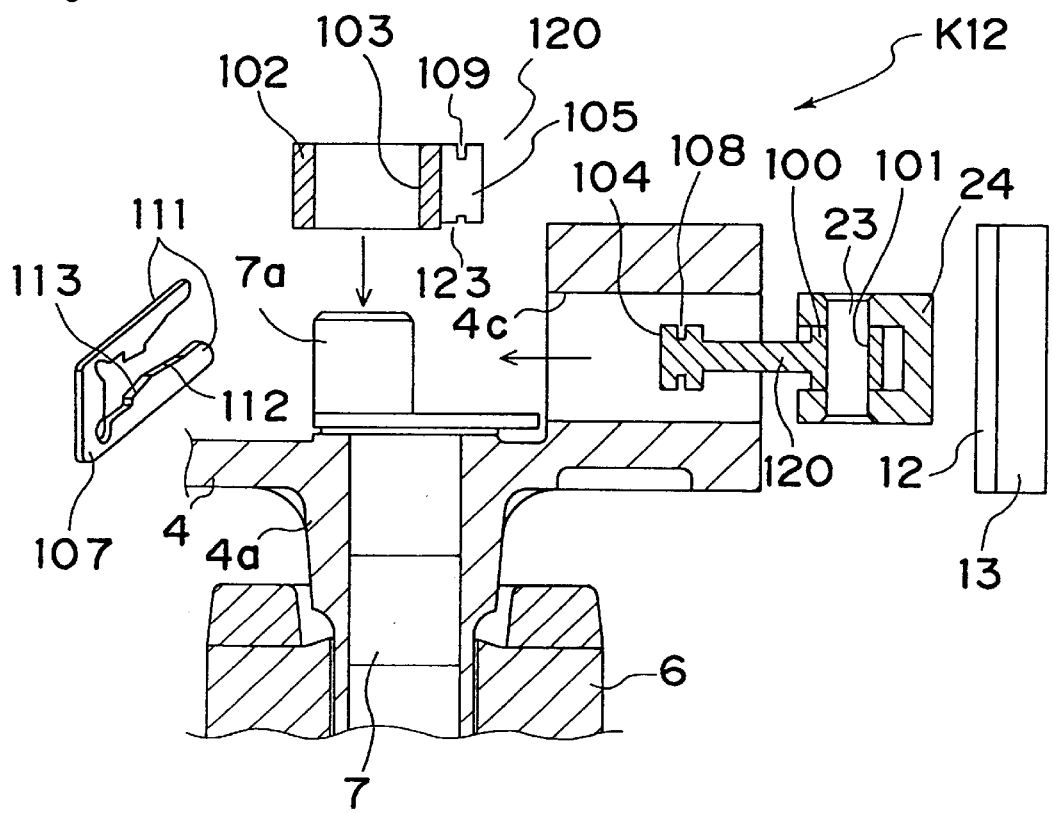
FIG. 30 is fragmentary exploded view of a reciprocating compressor according to a twelfth embodiment of the present invention.
Figure 31:
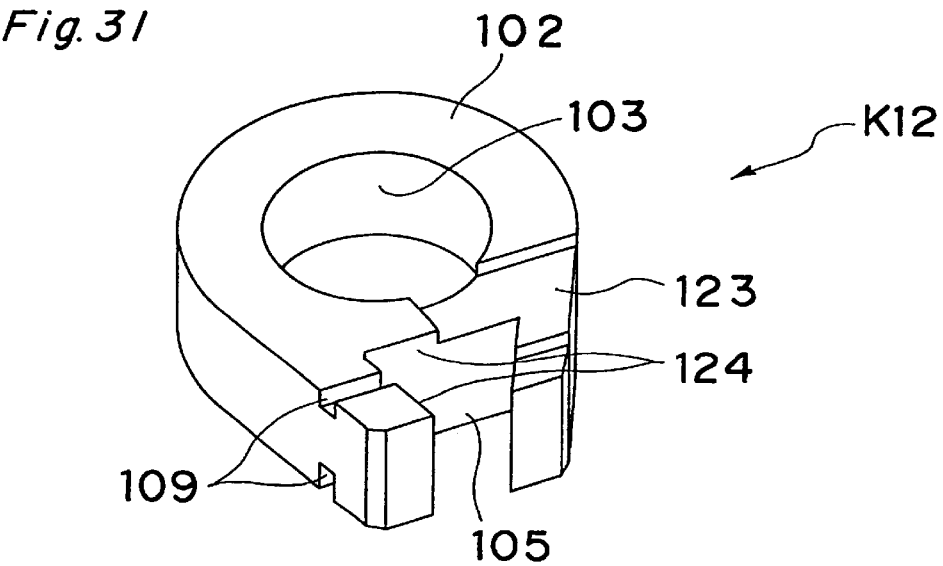
FIG. 31 is a perspective view of an overturned large end portion of a connecting rod of the reciprocating compressor of FIG. 30.
Figure 32:
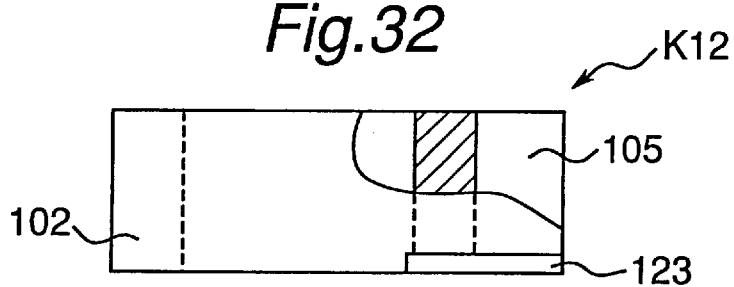
FIG. 32 is a side elevational view of the large end portion of FIG. 31.

FIG. 30 shows a reciprocating compressor K12 according to a twelfth embodiment of the present invention. The reciprocating compressor K12 includes a connecting rod 120. As shown in FIGS. 31 and 32; a recessed portion 123 is formed on the lower face of the large end portion 102 of the connecting rod 120 along two sides or one side of a periphery of the dovetail groove 105 so as to form retaining faces 124 acting as positioning faces for assembly. Since other constructions of the reciprocating compressor K12 are similar to those of the reciprocating compressor K10, the description is abbreviated for the sake of brevity.

Figure 33:
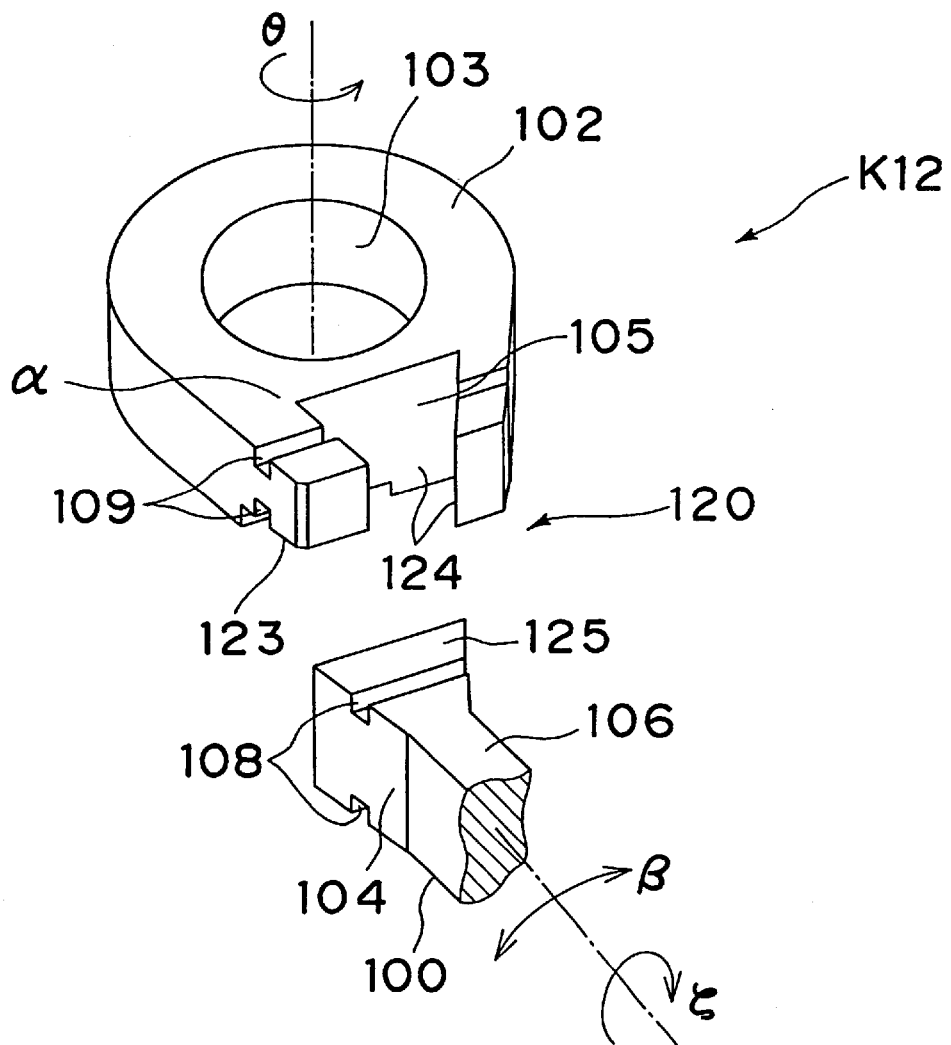
FIG. 33 is a perspective view indicative of coupling between the large end portion and a small end portion of the connecting rod of the reciprocating compressor of FIG. 30.

Hereinafter, assembly steps of the reciprocating compressor K12 of the above described arrangement are described with reference to FIGS. 30–33. The crank shaft 7 is preliminary mounted in the crank case 4 and an assembly in which the small end portion 100 is coupled with the piston 24 by the piston pin 23 is inserted into the cylinder 4c as shown. Then, the crank shaft 7a of the crank shaft 7 is inserted into the large hole 103 and the dovetail 104 is inserted into the dovetail groove 105. At this time, the dovetail 104 of the small end portion 100 has degrees of freedom of movement in a sliding direction S of the piston 24, in a pivotal direction β of the connecting rod 120 and a rotational direction ξ about an axis of the cylinder 4c as shown in FIG. 33. On the other hand, the large end portion 102 has degrees of freedom of movement in a rotational direction α of the crank shaft 7 and in a rotational direction θ about the eccentric shaft 7a. Therefore, when the dovetail 104 is fitted into the dovetail groove 105, the recessed portion 123 of the large end portion 102 and an upper face 125 of the dovetail 104 are initially brought into contact with each other so as to restrain movement in the rotational direction ξ. Then, two neighboring sides of the dovetail 104 are regulated by the retaining face 124 such that the sliding direction S of the small end portion 100, the pivotal direction β, the rotational direction a and the rotational direction θ are defined. Thus, by displacing the large end portion 102 axially to a predetermined position, the dovetail 104 is fitted into the dovetail groove 105. Subsequently, by press fitting the clamp 107 into the engageable slots 109 and the engageable recesses 108 horizontally, assembly of the reciprocating compressor K12 is completed.

In the reciprocating compressor K12 of the above described arrangement, the dovetail 104 and the dovetail groove 105 can be easily positioned and assembled. Furthermore, the small end portion 100 and the large end portion 102 are positively coupled with each other securely in the sliding direction S of the piston 24 by the dovetail 104 and the dovetail groove 105. Meanwhile, vertical movement of the small end portion 100 and the large end portion 102 is prevented by the clamp 107. Furthermore, since a clearance of, for example, about 5 to 20 μms for permitting the dovetail 104 to be fitted into the dovetail groove 105 is provided between the dovetail 104 and the dovetail groove 105, error not only in parallelism between the small hole 101 and the large hole 103 but in orthogonality between the eccentric shaft 7a and the cylinder 4c is reduced, so that extremely high dimensional accuracy is not required and abnormal rubbing between the components can be prevented. As a result, loss in mechanical slide and rotational loss can be reduced.

Figure 34:
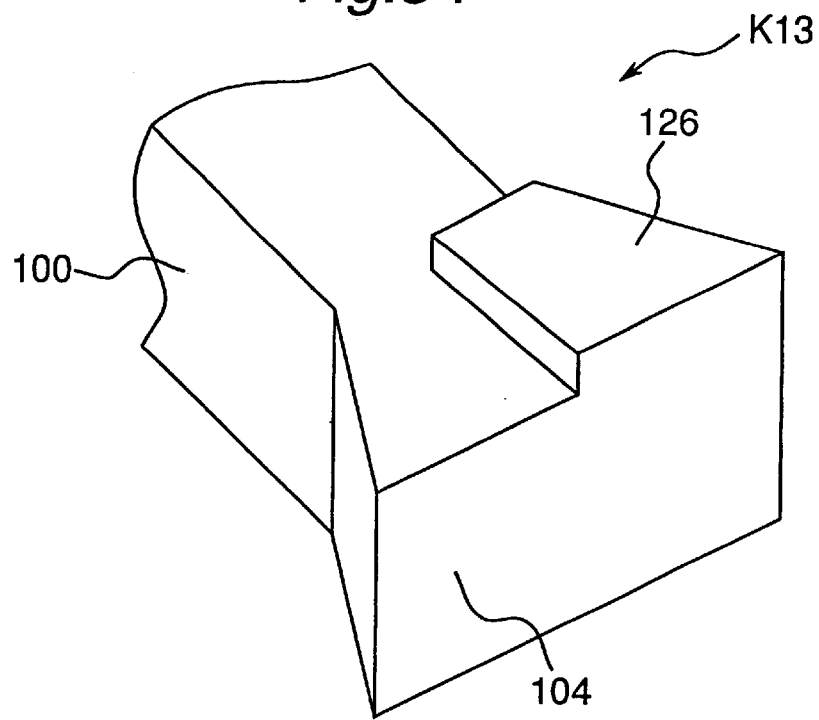
FIG. 34 is a fragmentary perspective view of a small end portion of a connecting rod of a reciprocating compressor according to a thirteenth embodiment of the present invention.
Figure 35:
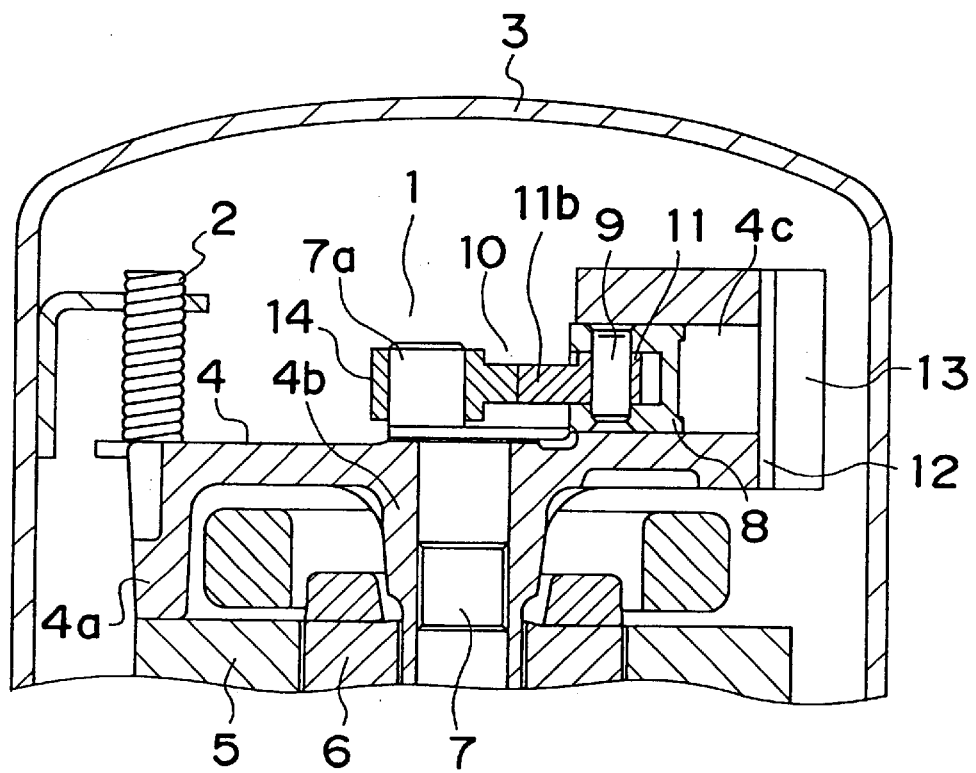
FIG. 35 is a partly sectional fragmentary view of a prior art reciprocating compressor.
Figure 36:
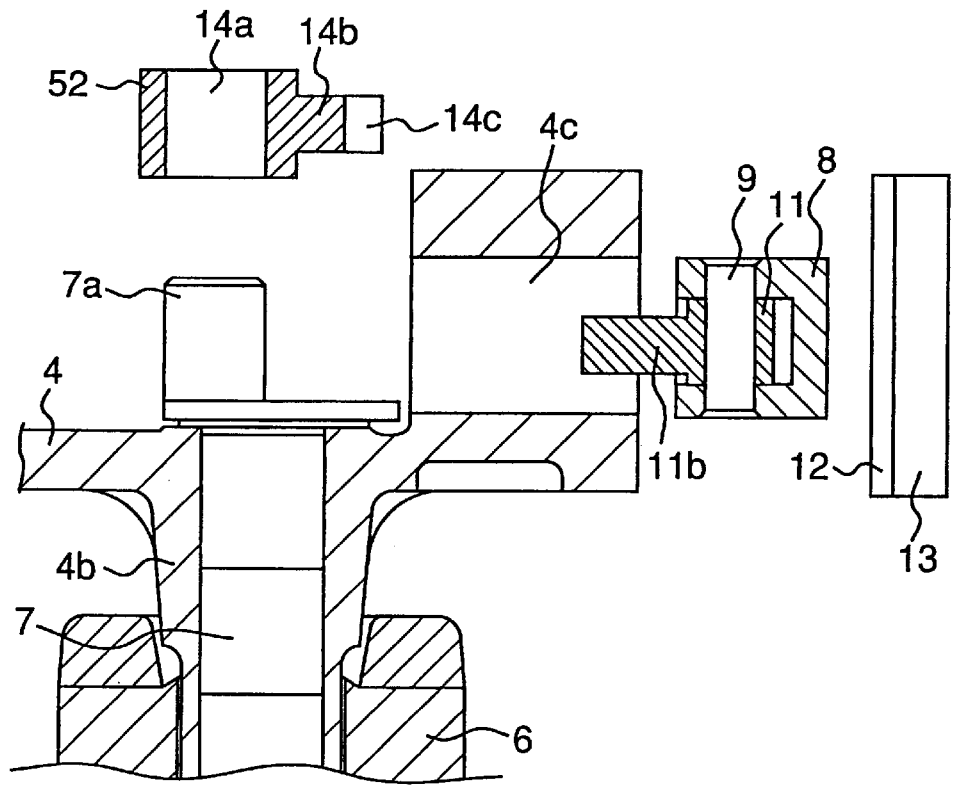
FIG. 36 is a partly sectional exploded view of the prior art reciprocating compressor of FIG. 35, particularly showing a connecting rod and a piston.
Figure 37:
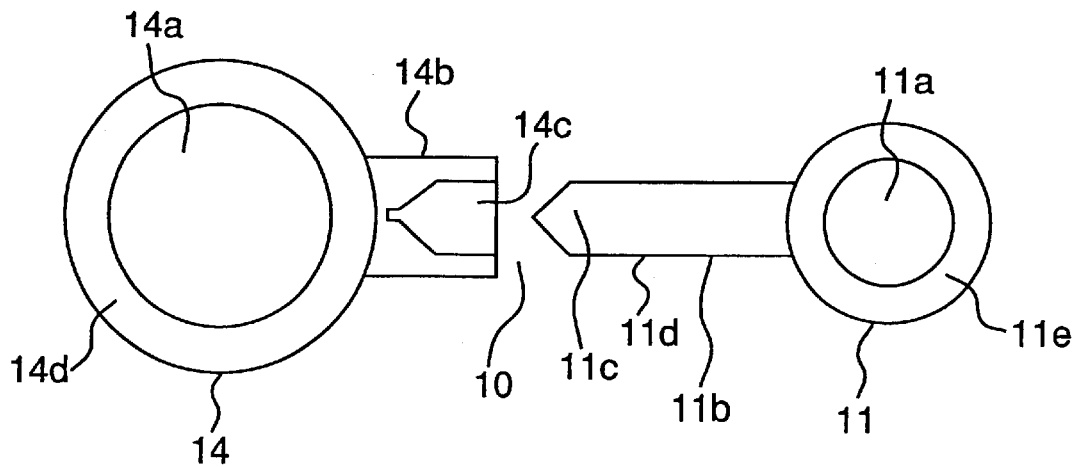
FIG. 37 is an exploded top plan view of the connecting rod of FIG. 36.

FIG. 34 shows the small end portion 100 of a reciprocating compressor K13 according to a thirteenth embodiment of the present invention. In FIG. 34, at one vertex portion of the dovetail 104 of the small end portion 100 of the reciprocating compressor K13, a projecting retaining portion 126 having two sides continuous with those of the dovetail 104 of the reciprocating compressor K13 projects upwardly slightly from an upper face of the dovetail 104. By bringing the two sides of the projecting retaining portion 126 with those of the dovetail groove 105, the dovetail 104 can be positioned relative to the dovetail groove 105 quite easily.

By the above described arrangements of the reciprocating compressors K12 and K13, the dovetail groove and the dovetail each having the several degrees of freedom of movement can be positioned easily and positively and the small end portion and the large end portion of the connecting rod are coupled with each other by the dovetail and the dovetail groove such that vertical movement of the small end portion and the large end portion is prevented by the clamp. However, since the minute clearance is provided between the dovetail and the dovetail groove, this clearance reduces machining errors of the components of the reciprocating compressors K12 and K13 so as to facilitate machining of the components and lessens abnormal rubbing between the components during operation so as to reduce loss in rotation and slide.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A reciprocating compressor comprising:
   a connecting rod which includes a small end portion and a large end portion coupled with each other, said small end portion comprising a cylindrical portion which includes a small hole, said small end portion further comprising a cylindrical rod portion integrally connected to and extending in a direction radially outward from said cylindrical portion, said cylindrical rod portion having a cylindrical retaining portion provided at a distal end portion thereof, and having a holder portion adjacent to said cylindrical retaining portion and extending in a radial direction with respect to said cylindrical rod portion, said holder portion having an auxiliary shoulder portion facing toward said distal end portion of said cylindrical rod portion, said large end portion including a large hole;

a piston coupled to said small end portion;

a crank shaft loosely fitted in said large hole of said large end portion, said large end portion having a boss with an end face and a cylindrical bore formed in said end face, said cylindrical bore having an axis passing through a center of said large hole of said large end portion, said large end portion further comprising a fixing hole communicating with said cylindrical bore, said cylindrical retaining portion being fitted in said cylindrical bore such that said auxiliary shoulder portion of said holder portion contacts said end face of said bore; and a locking pin inserted in said fixing hole to fix said cylindrical retaining portion in said cylindrical bore, said locking pin comprising a flexible locking pin so as to have a self-compensating function of absorbing torsional deflection of axes of said small hole and said large hole.

2. A reciprocating compressor as claimed in claim 1, wherein said crank shaft further comprises an eccentric shaft coupled to said large end portion at said large hole.

3. A reciprocating compressor as claimed in claim 1, wherein said cylindrical retaining portion is loosely fitted in said cylindrical bore.

4. A reciprocating compressor as claimed in claim 1, further comprising a piston pin loosely fitted in said small hole of small end portion to couple said piston with said small end portion.

5. A reciprocating compressor comprising:

a connecting rod which includes a small end portion and a large end portion, said small end portion having a small hole therein and a cylindrical rod portion extending in a direction radially outwardly from said small hole, said cylindrical rod portion having a retaining hole therein and a cylindrical retaining portion which includes a substantially conical distal end, said large end portion including a large hole, said cylindrical rod portion including a holder portion adjacent to said cylindrical retaining portion and extending in a radial direction with respect to said cylindrical rod portion, said holder portion having an auxiliary shoulder portion facing toward a distal end portion of said cylindrical rod portion;

a piston coupled to said small end portion;

a crank shaft coupled to said large end portion, wherein said large end portion further comprises a boss having a cylindrical bore and a fixing hole, said fixing hole communicating with said cylindrical bore, said cylindrical bore having a substantially conical shape at an end thereof, said cylindrical bore extending from an end face of said boss towards said large hole, said cylindrical retaining portion of said cylindrical rod portion fitting in said cylindrical bore such that said auxiliary shoulder portion of said holder portion contacts said end face of said boss, said large end portion having an oil hole therein for communicating a tip of said substantially conical end of said cylindrical bore with said large hole, said crank shaft comprising an oil groove in communication with said oil hole of said large end portion, said cylindrical retaining portion being fitted in said cylindrical bore; and a locking pin inserted in said fixing hole and said retaining hole to fix said cylindrical retaining portion in said cylindrical bore, said locking pin comprising a flexible locking pin so as to maintain axes of said small hole and said large hole on a single plane.

6. A reciprocating compressor as claimed in claim 5, further comprising a piston pin loosely fitted in said small hole of small end portion to couple said piston with said small end portion.

7. A reciprocating compressor as claimed in claim 5, further comprising a piston pin for coupling said piston to said small end portion at said small hole.

8. A reciprocating compressor as claimed in claim 5, wherein said crank shaft further comprises an eccentric shaft coupled to said large end portion at said large hole.

9. A reciprocating compressor as claimed in claim 5, wherein said cylindrical bore of said boss extends towards a center of said large hole to such a depth so as not to open to said large hole.

10. A reciprocating compressor as claimed in claim 5, wherein said flexing locking pin has a self-compensating function of absorbing torsional deflection of axes of said small hole said large hole.

* * * * *